AUDIBLE AND VISUAL TWO-WAY COMMUNICATION AND ANNUNCIATION SYSTEM FOR HOSPITALS AND THE LIKE

Filed Feb. 12, 1952 12 Sheets-Sheet 1

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Rogan
ATTORNEY

April 3, 1956 A. W. SCHNEIDER ET AL 2,740,842

AUDIBLE AND VISUAL TWO-WAY COMMUNICATION AND ANNUNCIATION SYSTEM FOR HOSPITALS AND THE LIKE

Filed Feb. 12, 1952 12 Sheets-Sheet 3

INVENTORS
ARTHUR W. SCHNEIDER
BERNARD COOPERMAN
BY John J. Rogan
ATTORNEY

April 3, 1956 A. W. SCHNEIDER ET AL 2,740,842

AUDIBLE AND VISUAL TWO-WAY COMMUNICATION AND ANNUNCIATION SYSTEM FOR HOSPITALS AND THE LIKE

Filed Feb. 12, 1952 12 Sheets-Sheet 4

INVENTORS
ARTHUR W. SCHNEIDER
BERNARD COOPERMAN
BY John J. Ragan
ATTORNEY

INVENTORS
ARTHUR W. SCHNEIDER
BERNARD COOPERMAN
BY John J Rogan
ATTORNEY

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Ragan
ATTORNEY

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Rogan
ATTORNEY

INVENTORS
ARTHUR W. SCHNEIDER
BERNARD COOPERMAN
BY John J. Rogan
ATTORNEY

United States Patent Office
2,740,842
Patented Apr. 3, 1956

2,740,842

AUDIBLE AND VISUAL TWO-WAY COMMUNICATION AND ANNUNCIATION SYSTEM FOR HOSPITALS AND THE LIKE

Arthur W. Schneider, Mamaroneck, and Bernard Cooperman, Bronx, N. Y., assignors to Commercial Radio-Sound Corp., New York, N. Y., a corporation of New York Application February 12, 1952, Serial No. 271,128
33 Claims. (Cl. 179—27)

This invention relates to communication systems and more especially to systems for selectively establishing audible, visual or similar communication circuits.

A principal object of the invention is to provide a novel and improved intercommunication system which is especially adapted for use in communicating with personnel throughout a large building or multi-section area such, for example, as a hospital, administration building or the like. While the invention will be described in connection with a hospital communication system, it will be understood that the inventive concepts are equally applicable to other situations, such as those involved in business institutions, vessels, railroad trains, or any other multi-section area within which intercommunication circuits are to be selectively established.

Another object is to provide an automatic communication system employing selector switch means of the automatic seeking kind, and wherein a communication connection between any one of a multiplicity of local stations, for example hospital rooms, and a key point or points can be made without requiring complicated numerical or digital dialling or switching equipment.

Another object is to provide an automatic communication system having a central control point and a multiplicity of local stations, whereby any local station can communicate with personnel at said central control point or at certain remote points, and two-way telephone communication can be automatically established while requiring a minimum of switch controls, relays, and station indicating mechanisms.

In known communication systems of the annunciation kind where a central control unit is employed, that unit has necessarily been bulky and required relatively complex wiring because there are required one annunciator or indicator lamp and one station switch for each station to be served. Furthermore, these prior central control units must be conveniently located for direct manual operation of station selector and function controls, and usually take up valuable floor space, table or desk space. Where the prior central control unit is of the console type, bulky multi-conductor cable forms, sometimes three or four inches in diameter, must be extended from the floor or wall box to the control console, thus limiting the choice of location of the console and making any change of such location difficult and expensive.

Furthermore, in known communication systems, for example hospital intercommunication systems, the nurse or other attendant at the central point must first be informed either by individual lamps or the like, of the identity of the calling bedroom, and the attendant must manipulate a dial or similar device. The manual effort required by the attendant was, therefore, comparable to the operation of a telephone switchboard having extensions equal in number to the number of stations. Furthermore, with these prior arrangements, when more than one station is calling, there is no assurance that the attendant will take care of the call which was first placed. In accordance with the present invention, these and other disadvantages are overcome, and the attendant is enabled to answer the call which was placed first, and the completion of the communication circuit is immediately effected by lifting of a standard telephone handset by the attendant from its cradle or switch hook. In an alternative embodiment, the system can be arranged to enable a visual and audible connection to be established from a calling station to the central point without requiring any operations whatever by the attendant at the central point. Thus permitting monitoring to be effected at the central point immediately when a station places a call.

Accordingly, the system according to this invention has greater flexibility of functional control and greater flexibility for adding communication points without correspondingly increasing the complexity of the wiring or equipment. It also provides a foolproof, reliable system requiring a minimum of manual operations. In other words, the system according to this invention has the advantages of the usual dial-controlled system without requiring the usual dial and dial-responsive mechanisms. The connection is established between a central control point or an auxiliary control point, and any remote station practically instantaneously when the handset is removed from its support at the control point.

A feature of the invention relates to an automatic communication system wherein an attendant at a central point can cause an automatic seeking switch to scan continuously the various remote stations, such as those in patients' bedrooms, each for a predetermined time interval, and this scanning action can be effected by the attendant merely operating a single switch at the central point. Incoming calls arising during the scanning operation immediately take control and hold the scanning operation in abeyance until all waiting calls are answered.

Another feature of the invention relates to a selective scanning operation which can be controlled intermittently or continuously so as to enable the attendant to select any particular local station for establishing communication, or for monitoring the sound conditions at that station for any desired length of time. The attendant can thus establish instant communication with such station. The system is also arranged so that cancellation of waiting or stored calls is prevented during the selective scanning operation, so that when the communication to any particular station is terminated, the system automatically indicates the next waiting call.

Another feature relates to an automatic communication system wherein an attendant at a central point can cause a distinctive tone signal to be transmitted successively to each of the remote stations by operating a single switch at the central point. The system is also arranged so that this tone operation proceeds for one complete cycle until all the local stations have been scanned, and then it automatically ceases, or, if desired, the tone operation can proceed indefinitely until stopped by the attendant. During the tone transmission, all call-initiation signals from the various stations are stored without stopping the tone transmission operation. However, at the end of the tone transmission operation, the previous stored call signals are taken care of in the normal manner.

The system is also arranged so that where there are a plurality of central control points, such, for example, as a central control point on each floor, a main supervisory control station can be provided at any suitable location whereat visual and audible indications are automatically given whenever any call has been placed by a local station to its respective floor central station at a time when that floor central station is left unattended. The supervisory attendant is able by means of an auxiliary handset and selector switch to communicate directly with the calling station. As an additional feature, a suitable predetermined time delay can be provided before the unattended call signal indication is given at the supervisory station. This supervisory station is also equipped with another indicator mechanism for registering the total amount of unattended call time at any one or more of the floor central stations. Likewise the system is designed so that the supervisory attendant can visually signal and audibly communicate with any desired one of the floor central stations.

The system also provides arrangements whereby at special locations, such as operating rooms or other critical points, audible and visual communication can be had from such critical point to any central control point, but preventing any such central point from originating calls to the critical point or points.

A further feature relates to an automatic communication system wherein a central control panel is provided for effecting communication with any station which is calling an attendant, and the attendant can control the completion of the connection merely by removing his telephone handset. Similar control by an attendant can be effected at any one of a number of auxiliary points merely by plugging a telephone handset into a suitable jack located thereat.

A still further feature relates to the novel organization, arrangement and relative location and interconnection of parts which cooperate to provide a simplified and improved hospital or similar paging intercommunication system.

Other features and advantages not specifically enumerated will be apparent after a consideration of the following detailed descriptions and the appended claims.

In the drawing which shows by way of example one preferred embodiment,

Figures 2, 2A, 3, 4, 5E:
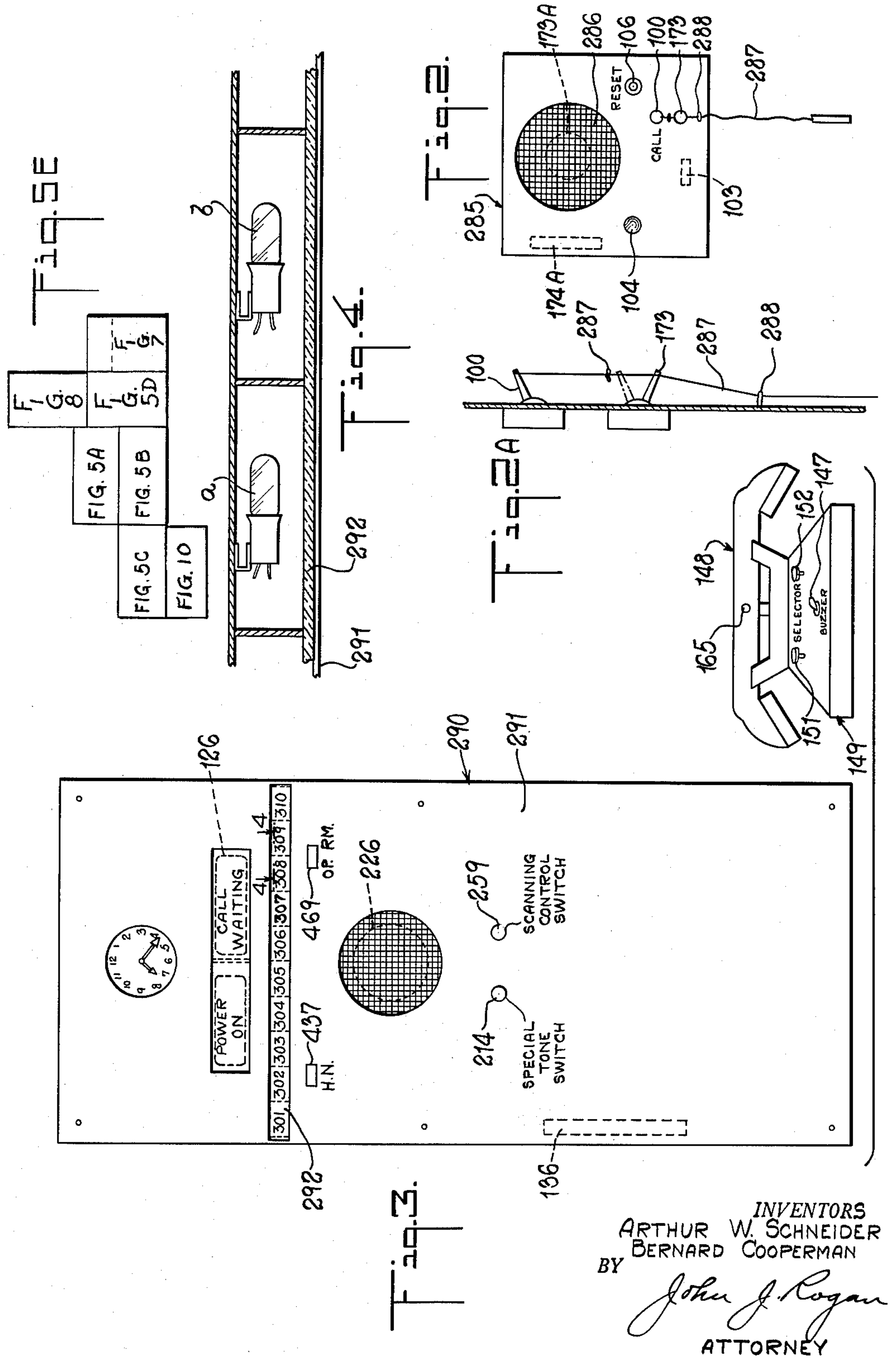
Fig. 2 is a front view of one of the patient's bedside units.
Fig. 2A is a side view of the pull cord switch control of Fig. 2.
Fig. 3 is a front view of the central control panel.
Fig. 4 is a sectional view of part of Fig. 3, taken along the line 4—4 thereof.

Fig. 5A, Fig. 5B, Fig. 5C, and Fig. 5D, placed side-by-side as shown in Fig. 5E, constitute a complete wiring diagram of certain of the local or bedroom stations and the nurse's central station on the corresponding floor, as well as the related controls, according to the invention.

Figures 6, 7:
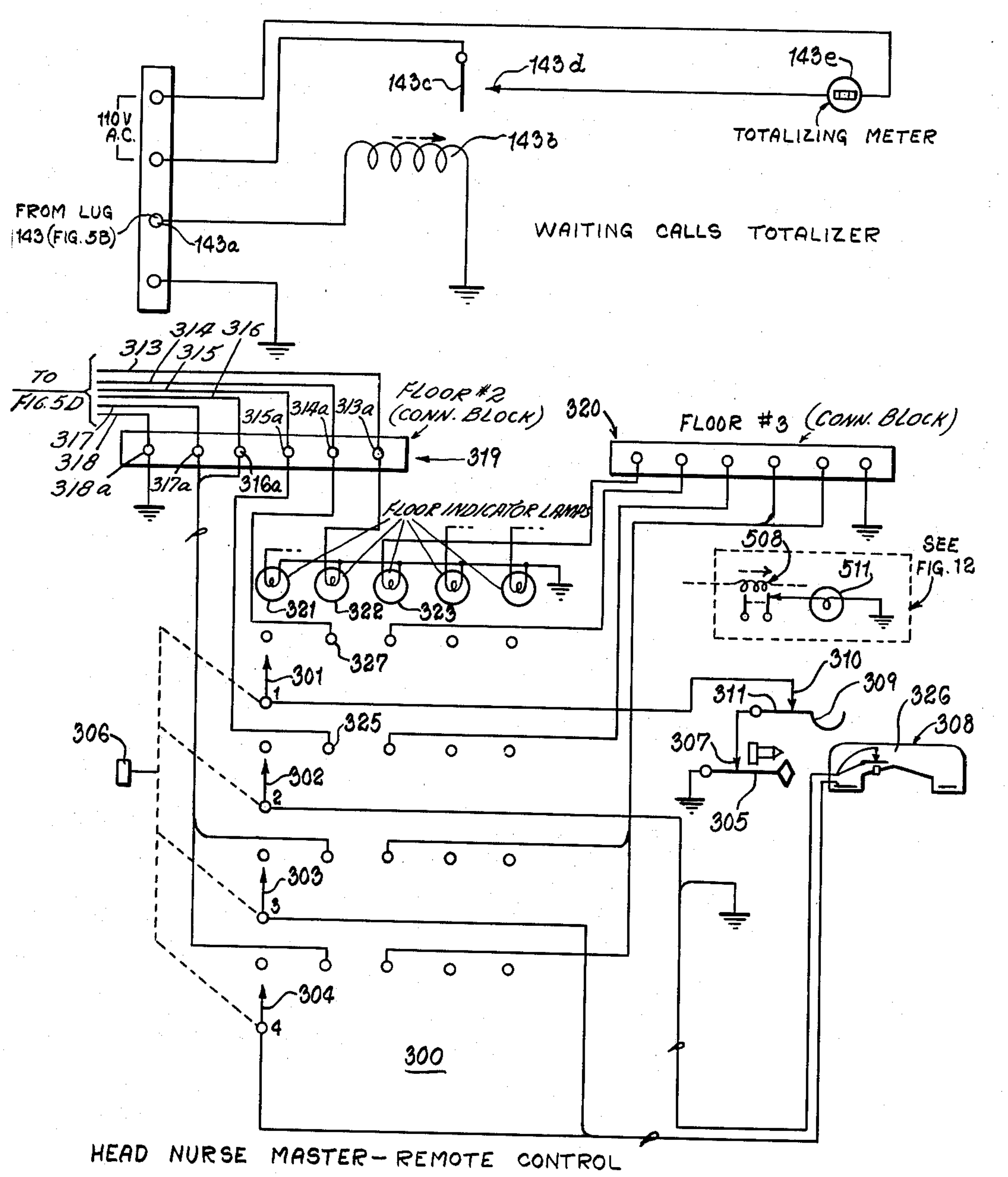

Fig. 6 shows the waiting calls totalizer.

Fig. 7 is a schematic diagram of the head nurse's master-remote control for monitoring nurses' central stations and for directly answering waiting patients' calls.

Figures 8, 9:
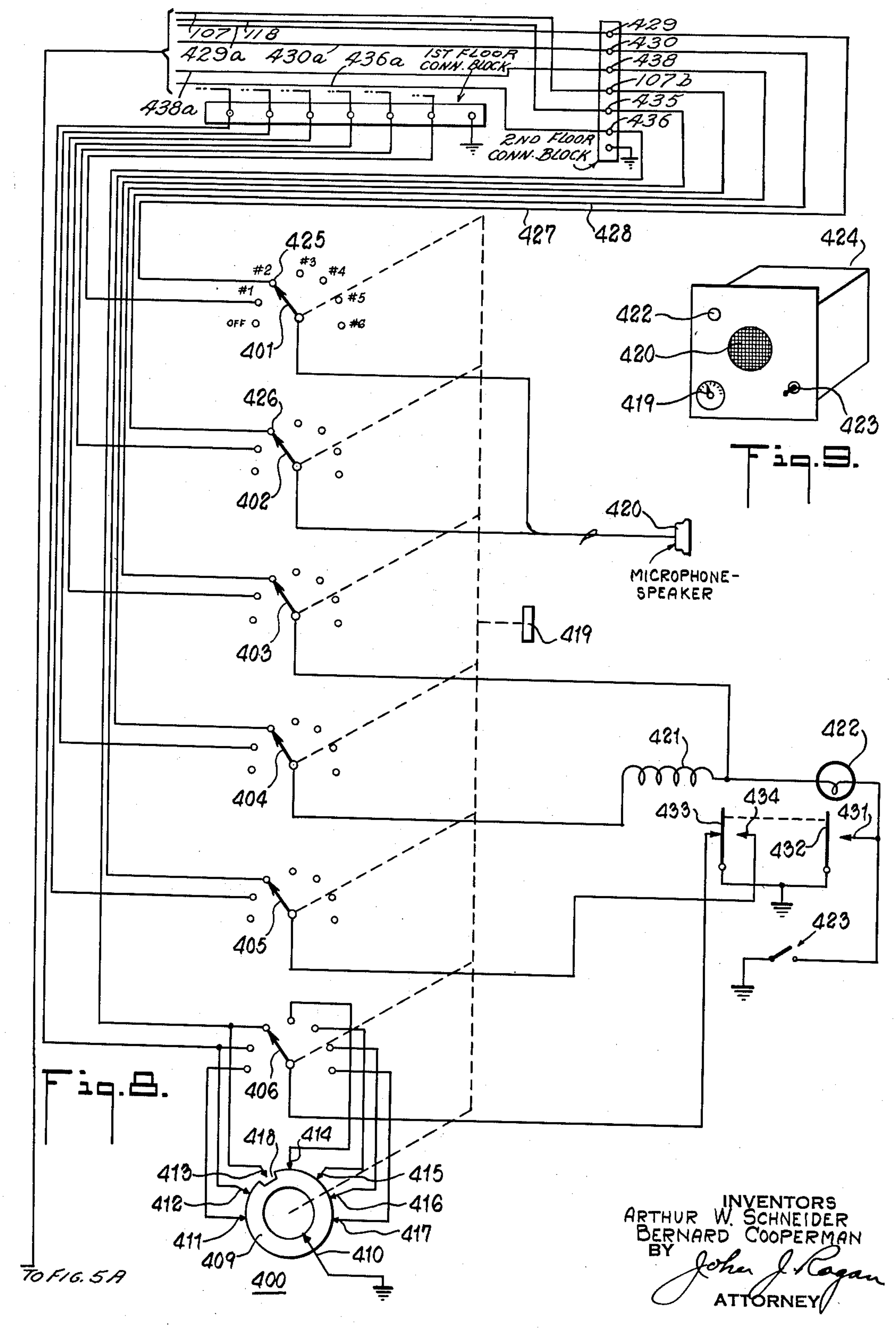

Fig. 8 is a schematic diagram of the master sub-station control for enabling a head nurse to call in nurses' central station.

Fig. 9 is a perspective view of part of the equipment of Fig. 8.

Figure 10:
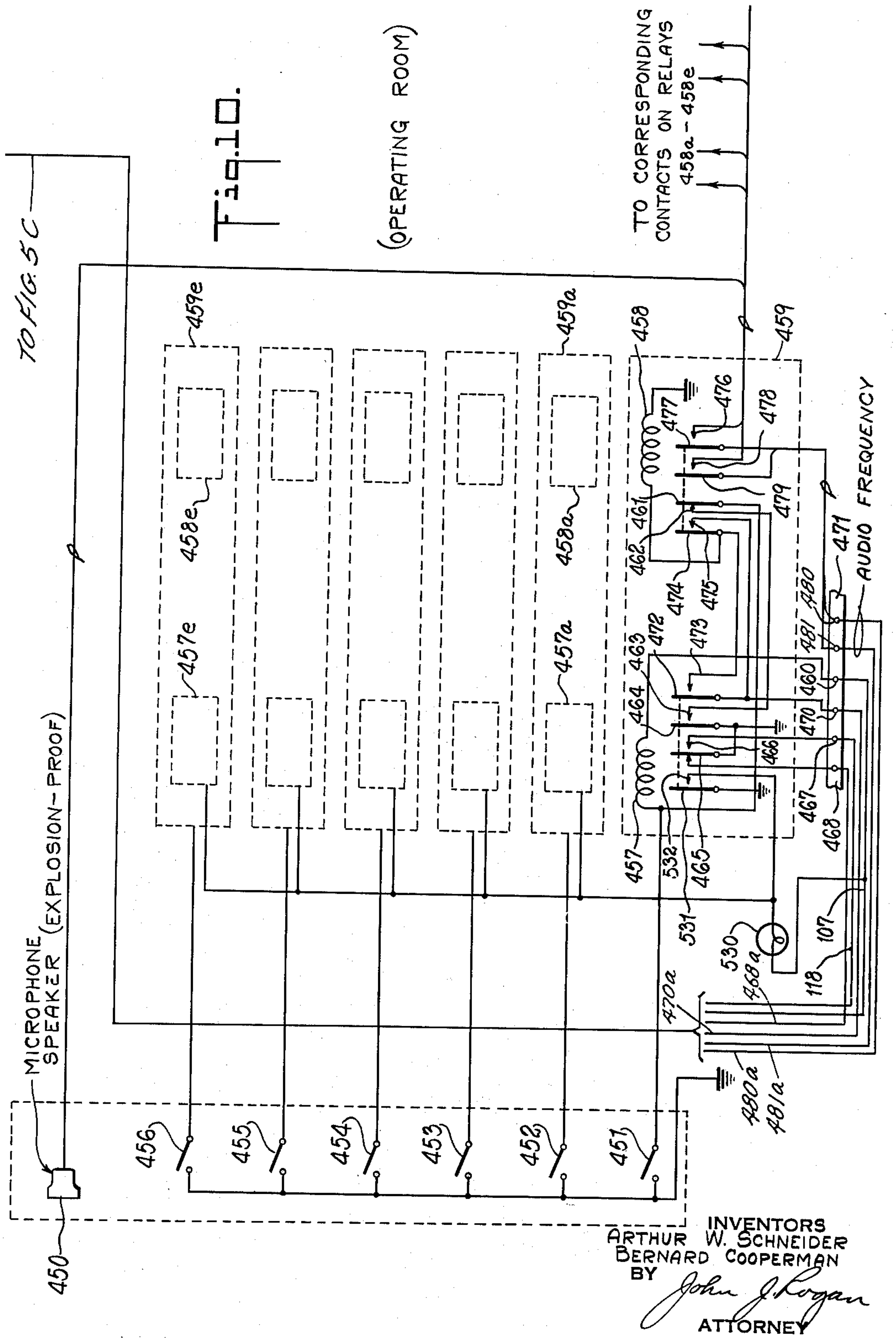

Fig. 10 is a schematic diagram of the operating room controls.

Figures 11, 12, 16:
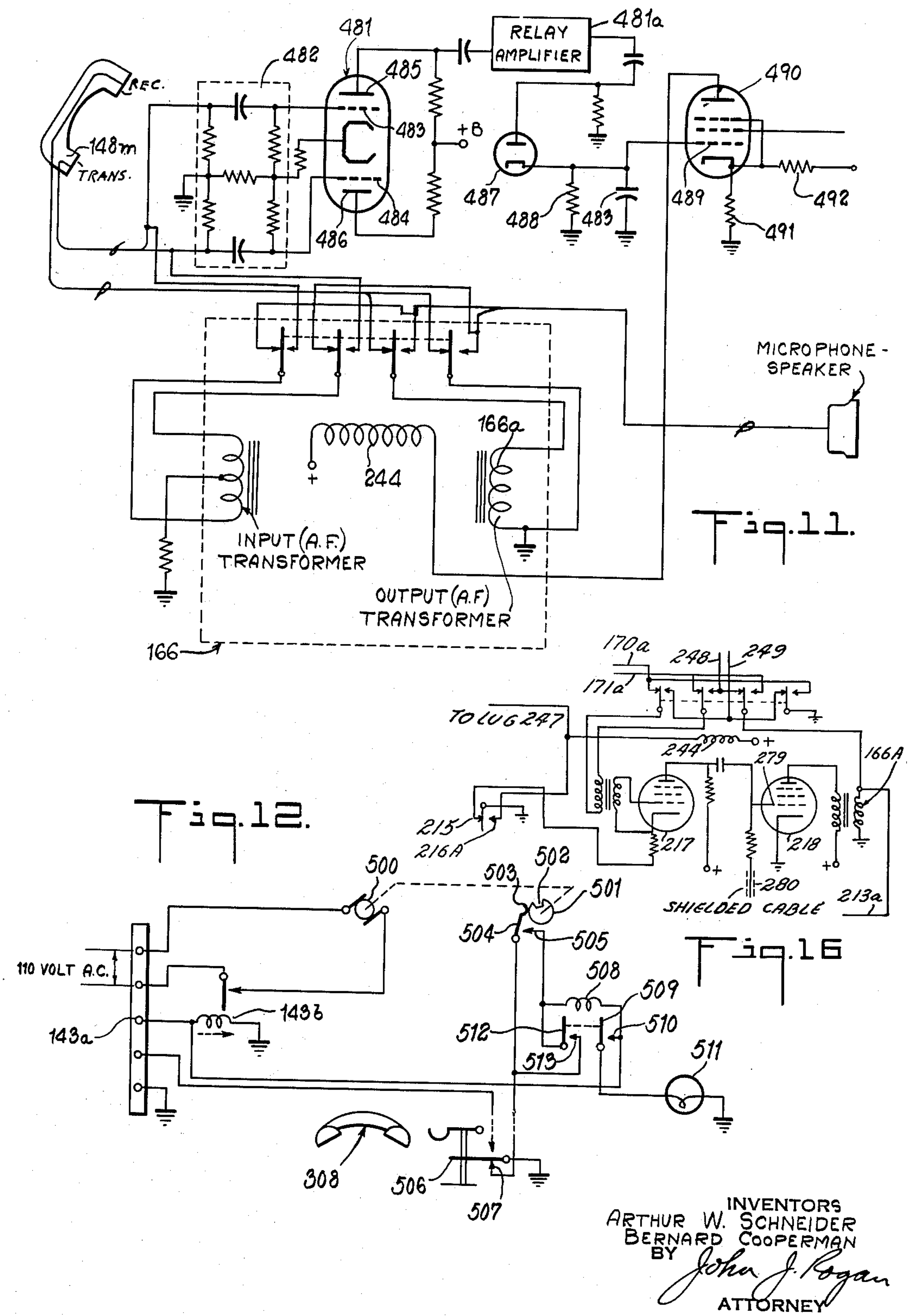

Fig. 11 is a schematic diagram of a modified talk-listen relay control circuit.

Fig. 12 is a schematic diagram of a time delay mechanizer for delaying starting of the totalizer of Fig. 6.

Figure 13:
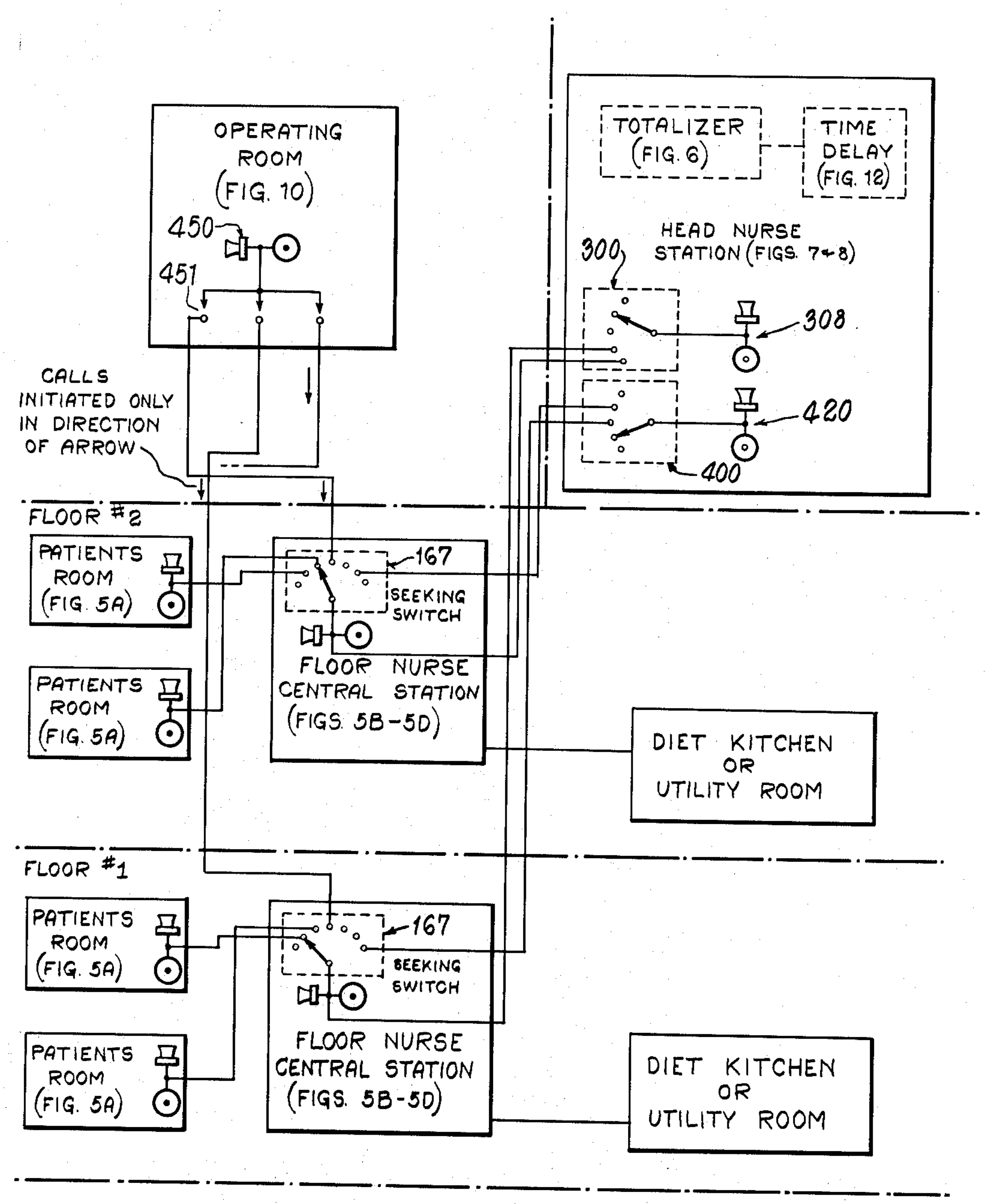

Fig. 13 is an overall schematic block diagram of the complete system.

Figures 14, 15:
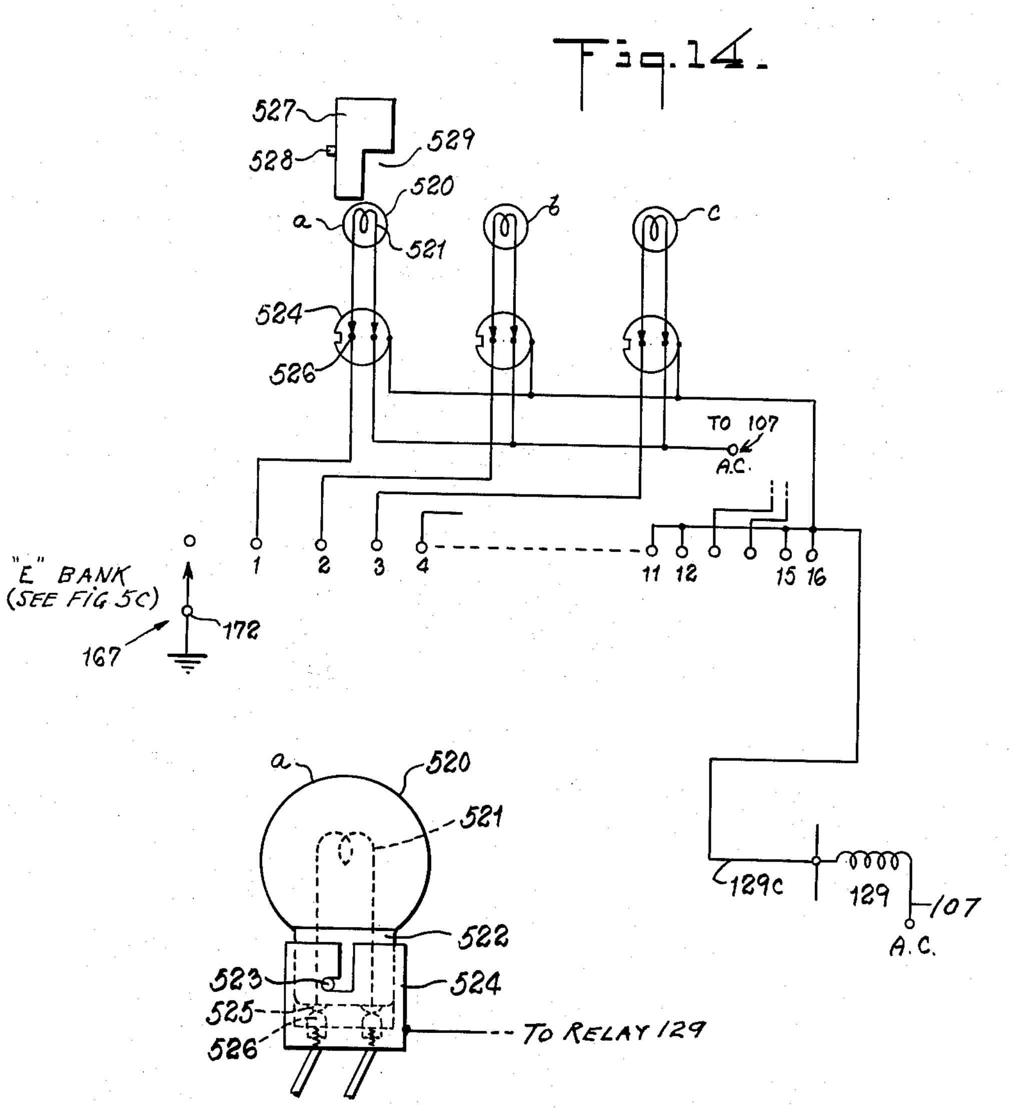

Figs. 14 and 15 are details of the "out of service" skipping control for the stepping switch.

Figure 5A:
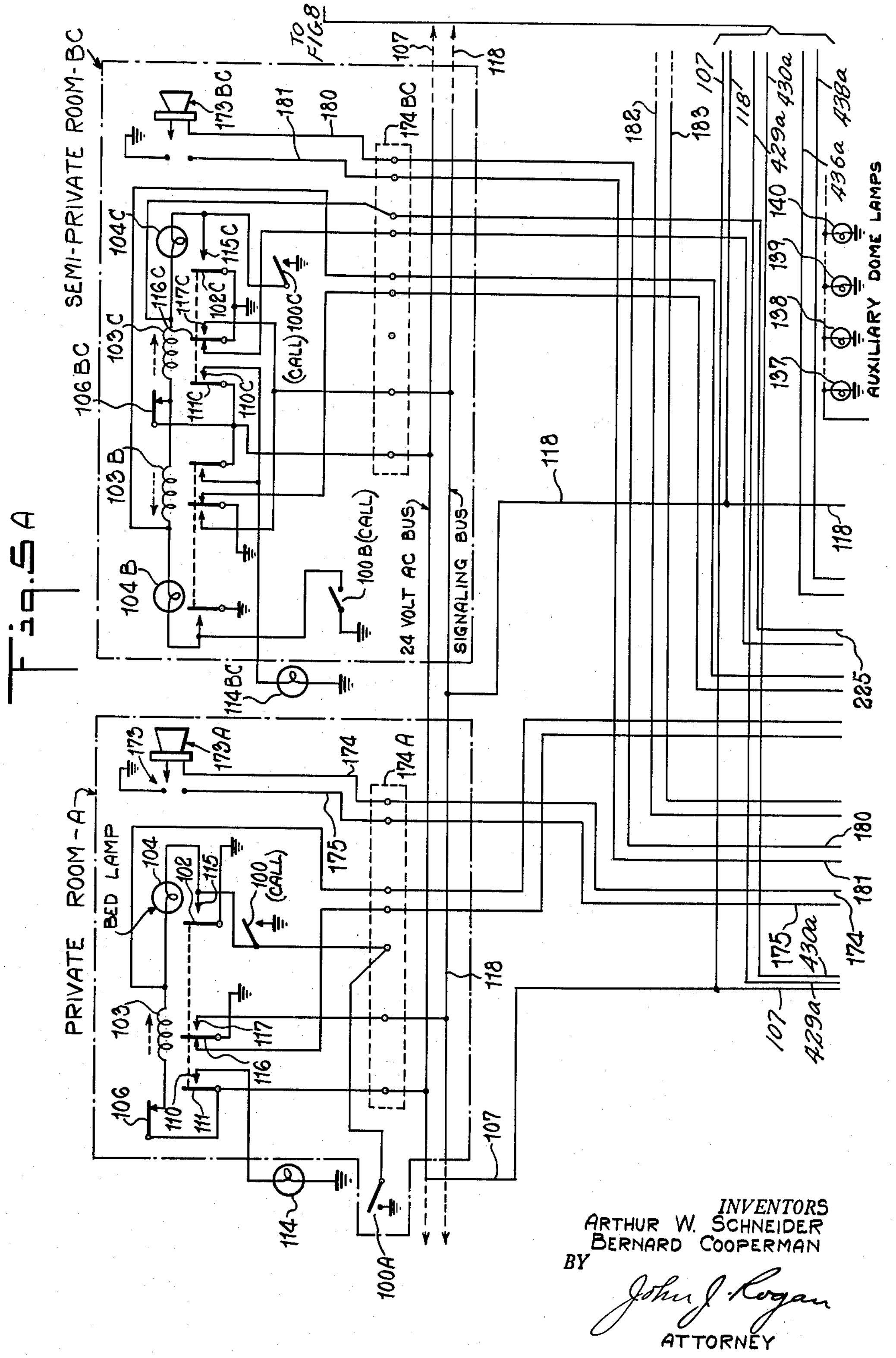
Figure 5B:
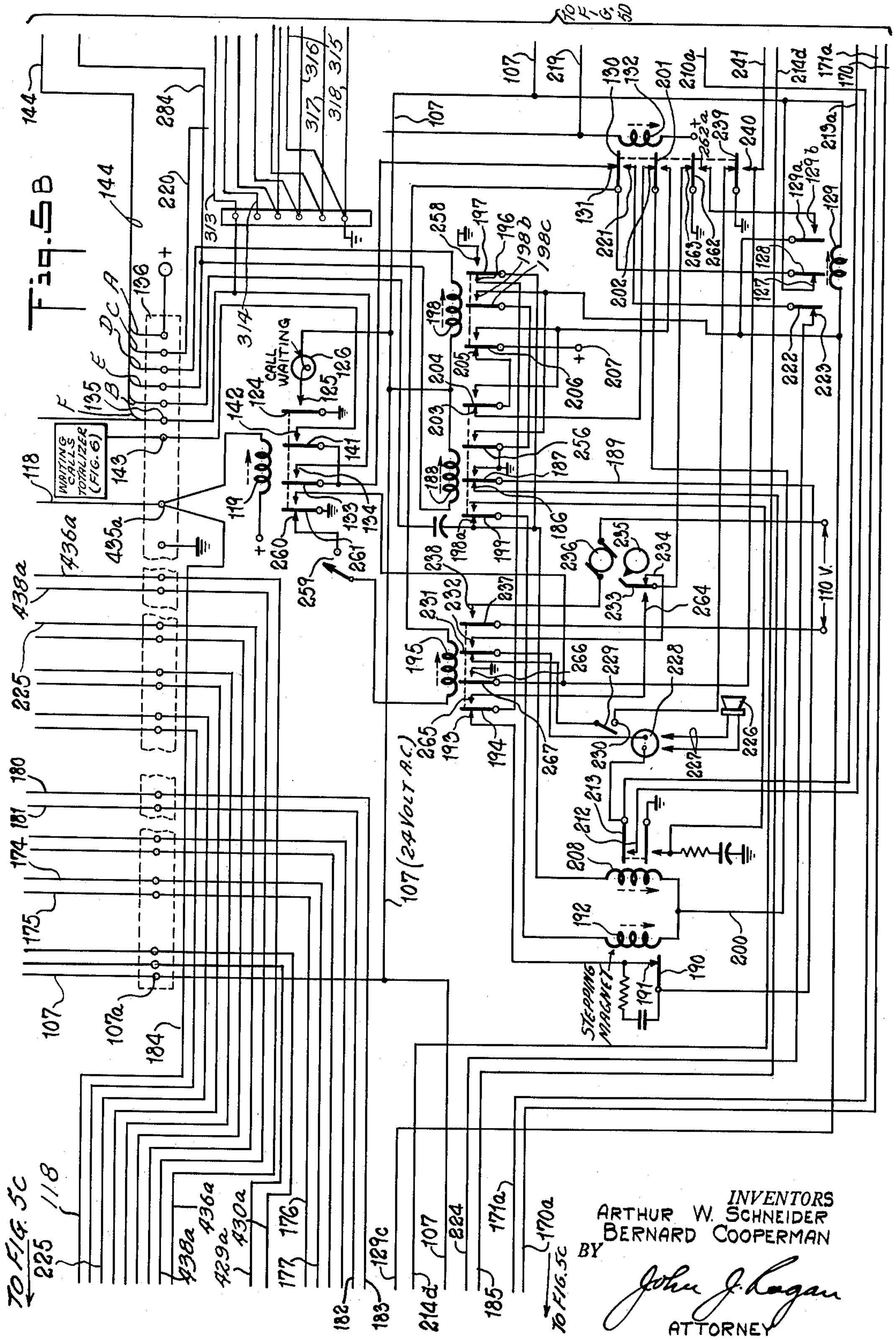
Figure 5C:
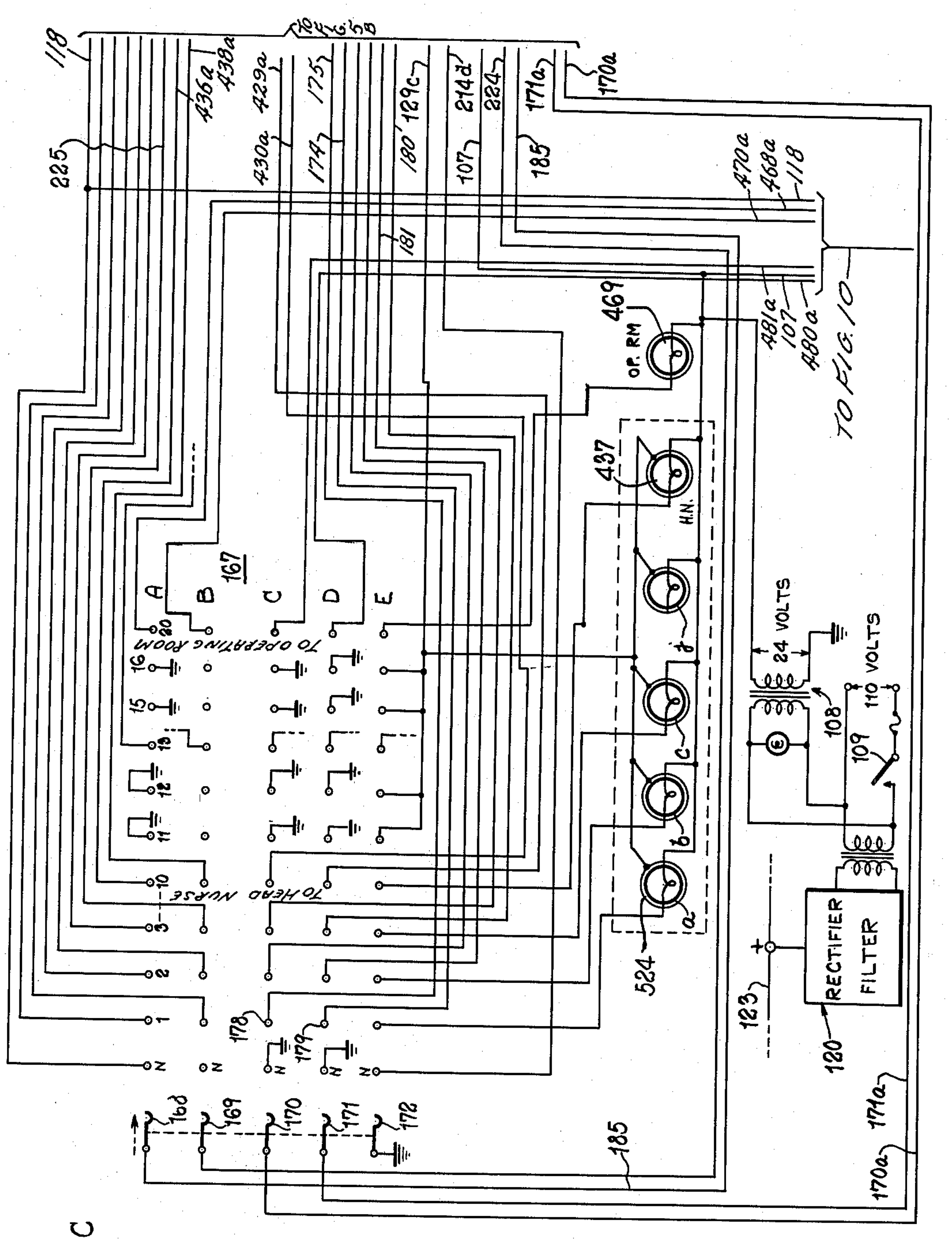
Figure 5D:
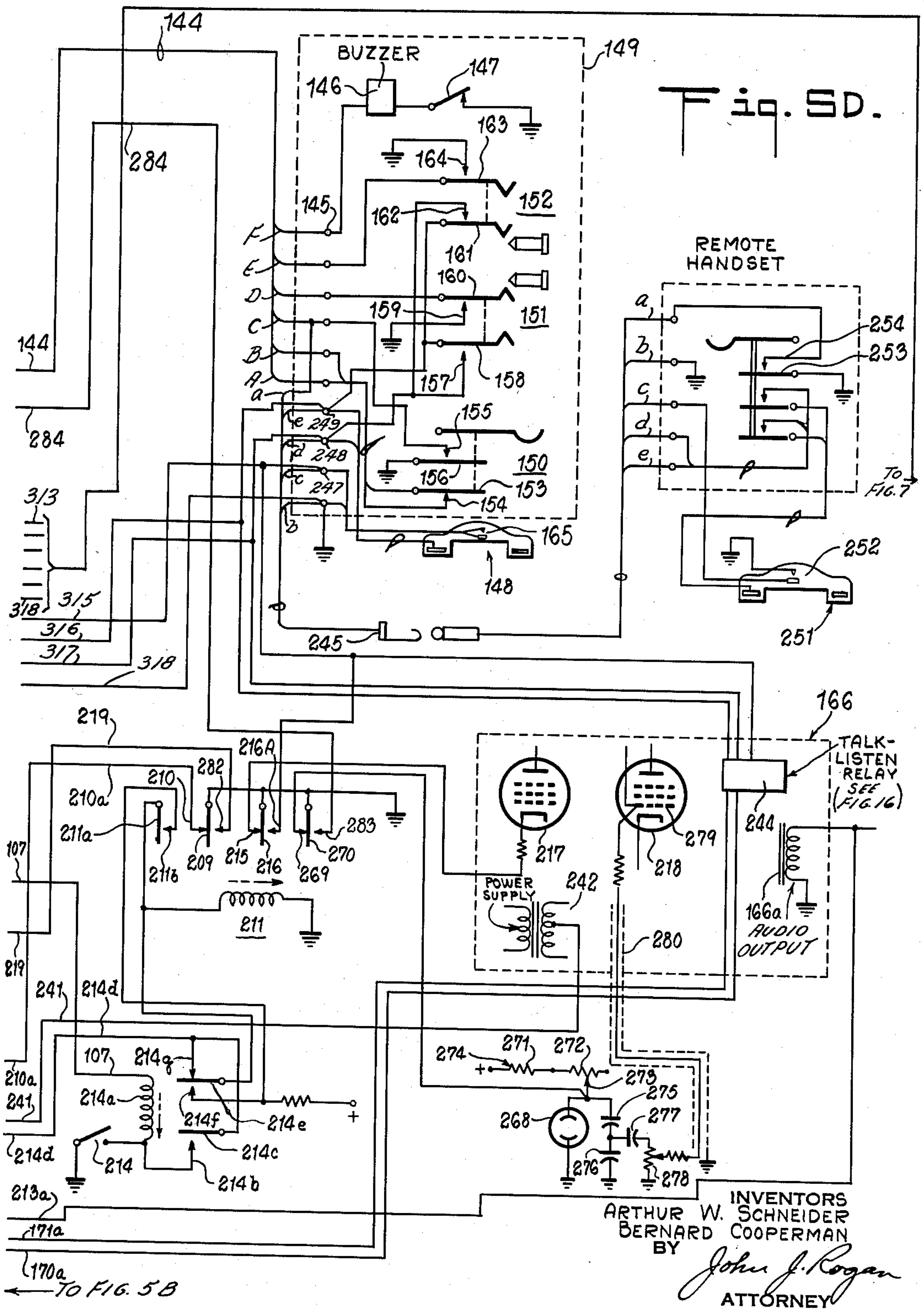

Fig. 16 is a detailed schematic wiring diagram of the talk-listen amplifier of Fig. 5D and Fig. 11.

*General description of apparatus*

Figure 1:
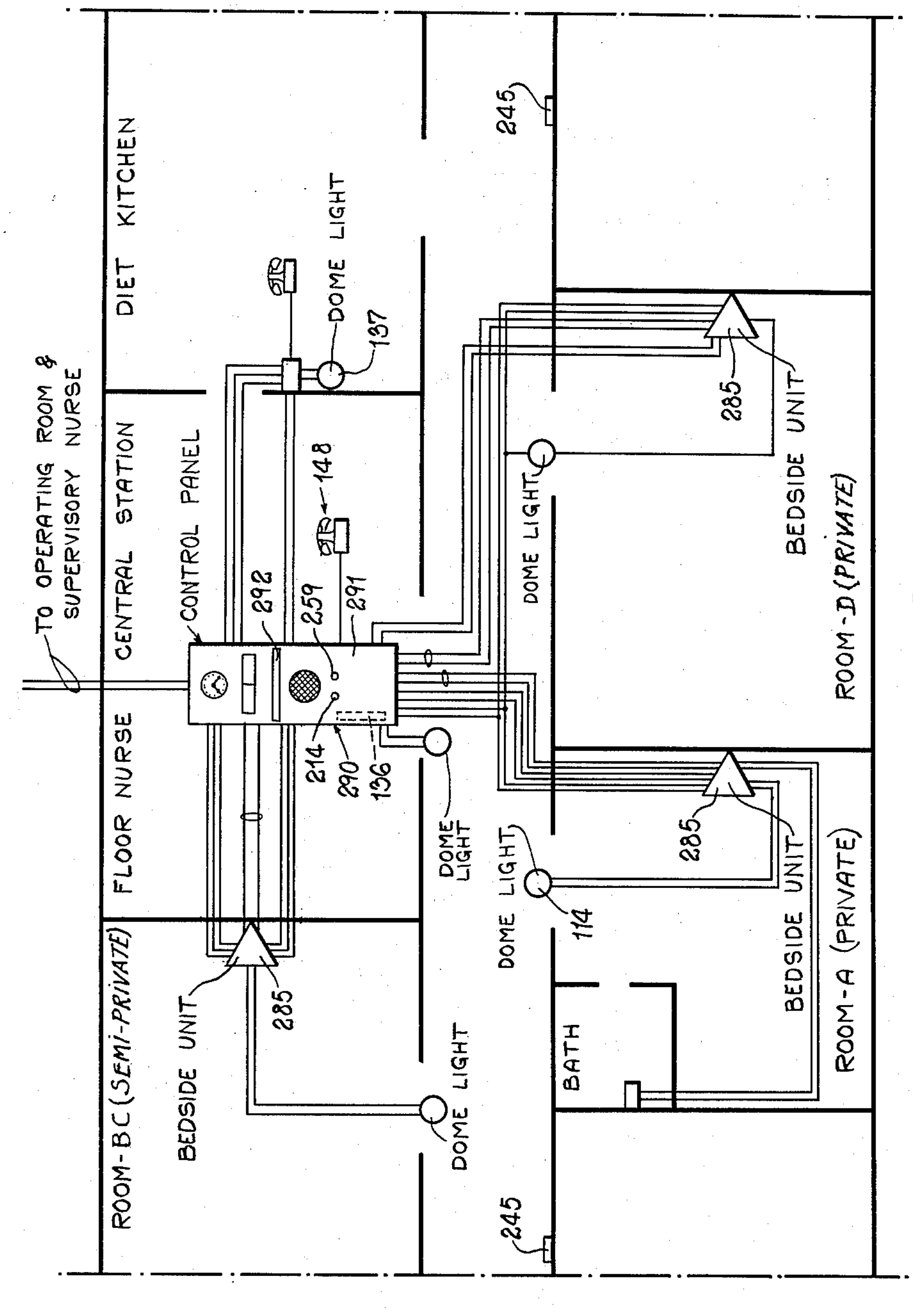
Fig. 1 is a layout of a typical part of a hospital floor embodying the system according to the invention.

Fig. 1 shows a typical layout of a part of a hospital floor, comprising, for example, patients' private bedrooms A, D, and a typical patients' semi-private bedroom BC (two or more patients per room), a diet kitchen, and the nurse's office, or central control point. Each bedroom door facing on the corridor has a dome light which when lighted is visible from any point along the corridor, and the various other rooms, such as diet kitchens, nurses' quarters, etc., also have respective dome lights which light whenever a patient desires to call an attendant. Any dome lights may be omitted or replaced by any other form of visual indicator.

Each bed may be equipped with its local station or bedside unit 285 by means of which the patient can signal for a nurse to establish communication circuit between the nurse's handset 148 and the microphone-loudspeaker unit which forms part of the bedside unit. The nurse's handset 148 is connected to the nurse's control panel 290. One of the local stations 285 is shown in front view in Fig. 2, and comprises a self-powered microphone-loudspeaker 173A wherein the loudspeaker can also be used as a microphone, and this self-powered unit can be protected by a perforated metal grill 286. The local station also includes a call-initiating switch 100. This switch may be a toggle controlled momentary contact switch operated by a pull cord 287, passing through a suitable eyelet 288. If desired, switch 100 may be a sturdy push-button extended to the patient's bed by means of a suitable length of insulated electric line cord terminating in the local station by a permanent connection or by a suitable plug. This plug can be screwed in a special receptacle so that if the plug becomes accidentally unscrewed, the receptacle itself will make contact and a signal will be transmitted as if the patient had operated switch 100 to place a call. When the cord is removed for sterilization, or for any other purpose, a distinctively colored cap can be screwed on to the receptacle in place of the removed plug.

The local station also includes a bedside signal light 104. A reset button 106 enables a call to be cancelled at the local station. The momentary operation of this reset button will extinguish all signal lights illuminated in response to the call. The bedside unit also includes a switch 173 which when operated to the privacy position prevents listening-in by the nurse or any other person at a remote point, but nevertheless permits a nurse at any remote point to call and talk to the patient. Switch 173 is preferably of the toggle lever type so that it stays put when operated to either of its positions, and has suitable indicia to indicate its position. Switch 100 may be normally spring-biased to its raised position. As shown in side view in Fig. 2A, the operating arms or levers for switches 100 and 173 are arranged vertically in alignment. The pull cord 287 can be fastened at its upper end to the arm of switch 100 and can then pass through an opening in the arm for switch 173. A knot **287*a* can be made in cord 287 so that if the arm of switch 173 is in its raised or privacy position (shown in dotted lines), the pulling of cord 287 to operate switch 100 will automatically insure the switch 100 being operated to the non-privacy position (shown in full lines). The local station also includes a relay 103 to control the setting-up of a call, by the momentary operation of the call button 100 and to render further operation of the button 100 ineffective until the call has been taken care of, or until button 106 is operated. Thus, relay 103 can be restored to its normal position either locally at the patient's bedside or at any one of the remote control points to be described. The bedside unit further includes a terminal strip 174A to which all wiring required for the unit is connected. If the patient's room is equipped with a private bath, an additional call button 100A, similar to button 100, may be installed therein. The system utilizes a number of so-called dome lights which may be of any conventional kind. These lights may be placed at different strategic locations, such, for example, as dome light 114** above the door to the patient's room visible from the corridor, and a series of similar auxiliary dome lights 137–140 at such points as nurses' quarters, diet kitchens, nurses' stations, etc.

The system also includes a central control unit, comprising a cabinet 290 at the central control station, for example above the nurse's desk, or at some other location visible from that desk. This cabinet also includes a terminal strip 136, at which all wiring from the various bedside units, signal lights, etc., terminate. The cabinet has a front cover plate 291 which completely closes the equipment and wiring within the cabinet. (See Figs. 3 and 4.)

This front cover 291 can have an elongated window in which is mounted an engraved strip 292, having a series of translucent numbered indicia, each corresponding to and identifying the respective patients' rooms; and an individual room identifying lamp, "a," "b," "c," etc., mounted in back of each of said indicia. If desired, individually numbered lamps may be used. The only item of equipment external to the wall cabinet is the nurse's telephone handset 148, supported, for example, on a desk-type telephone base 149, which, in addition to the usual switch hook contacts 150, houses the special controls, such as the continuous scanning control switch 152, the intermittent scanning control switch 151, and the signalling buzzer with its disabling switch 147.

The normal sequence of operations in answering a patient's call requires no manual operation beyond the mere lifting of the handset from its base. This handset can be placed at any convenient location within sight of the signal lamps "a," "b," "c," etc. The handset also includes a conventional press-to-talk button 165, by means of which a two-way conversation can be had between the nurse and the patient. When a call is originated by a patient, an audible signal provided by the buzzer within the base of the handset 149 is started and continues until the call is answered by the removal of the handset from its base. If the audible signal is to be stopped, switch 147 may be operated to silence the buzzer and only the visual signals given by the illumination of the appropriate lamp "a," "b," "c," and the dome lamp, calls-waiting lamp are given. The volume of the transmitted signals can be controlled, for example, by a suitable volume control resistor or resistors whose adjustable element is accessible from the front cover of the cabinet but requires operation by a screw driver or the like.

A unique feature of the system is that the central control functions can be duplicated at other locations remote from the central point and the system can be operated from any one of these or other locations, so far as answering calls is concerned, by merely plugging a telephone handset into a jack at the remote location.

*General description of normal operation*

As a result of the operation of the button or switch 100 at the patient's bedside, for example in room A, the room dome light 114 is illuminated and the calling patient's bedside lamp 104 is also illuminated. At the central control panel the room identifying lamp "a," "b," "c," etc., is lighted. Also, the various dome lamps 137–140 and the call-waiting lamp 126 are lighted, and the buzzer 146 in the handset 149 gives an audible signal that a call is waiting. If the central station is in use at the time another call is being originated, the call-waiting lamp 126 remains lighted to indicate that there are one or more calls waiting to be answered.

To answer the call, the nurse removes the handset 148 from its cradle whereupon all lamps that have been illuminated by the patient's call are extinguished except the particular lamp "a," "b," "c," etc., indicating the room to which the nurse's handset is at that instant connected. Whenever one or more calls are waiting to be answered, the lamp 126 remains lighted. The nurse can proceed with a two-way conversation with the calling patient without operating any manual switches, except the talk-listen button 165 in the handset. In an alternative form, the talk-listen button can be replaced by a voice-operated relay (Fig. 11).

On replacing the handset at the end of the conversation, the system immediately finds another waiting call and the various dome lamps are relighted and the buzzer reoperates, or if no calls are waiting the system restores itself to normal with all lamps extinguished. The patient's call may be answered by a passing nurse seeing the illuminated dome lamp near the door to the patient's room. This call can then be taken care of merely by the nurse entering the room and operating the reset button 106 which thereby cancels the call and extinguishes all the various signal lamps. The nurse's part in answering patients' waiting calls may be continued automatically in sequence with no switching operation other than the replacement of the handset 148 or the handset 251 (see Fig. 5D) on its cradle. As a result of replacing the handset, a hunting switch of the step-by-step or Strowger kind immediately finds the next calling station line and effects connections for two-way conversation between the nurse and patient.

The nurse can initiate communication with any desired patient merely by removing the handset 148 from its cradle and operating the button 152, which causes the finder switch to scan the various lines in succession without any further operation on the part of the nurse. As the switch connects each patient's line in circuit, the corresponding identifying lamp "a," "b," "c," etc., is lighted, and a two-way telephone channel is prepared between the nurse's handset and each room in succession. If it is desired to effect the scanning intermittently, instead of the nurse operating switch 152, she may operate and reoperate switch 151 successively to the lines leading to each room.

In order that the nurse may listen in to the various patients in sequence during the night time, or any other suitable time, a switch 259 at the central control panel is operated, which causes the finder switch continuously to scan the rooms in succession so as to connect the microphone-loud speaker unit 173A in each room for a predetermined time interval. By this operation the nurse is able to detect, by way of the monitor-speaker, unfamiliar sounds in the various rooms which may require special attention. Then, merely by lifting the handset the nurse can immediately establish two-way communication and further scanning is temporarily stopped until the handset is replaced.

The system is such that if during the above-noted supervising scanning operation a patient should originate a call, the scanning operation stops and the system automatically finds a calling station and all signal lights normally associated with such a call come into operation. After the nurse has answered this particular call by lifting and replacing the handset 148, the system automatically resumes the supervisory scanning operation.

The system is also arranged so that merely by operating a single switch 214 at the central control panel, a distinctive tone can be transmitted automatically to each bedside unit in sequence to indicate termination of visiting hours or other period or event.

By momentary operation of a switch, this tone transmission can be effected until each room received the tone signal, and it is then shut off automatically after all the rooms have received the signal. By leaving the said switch operated the tone can recurrently be transmitted to the rooms in successive cycles. If any calls have come in during a tone transmission cycle, they are stored and remain stored after the cycle is completed and until answered by the attendant.

*Single-call operation*

It will be assumed that only a single call is made by one patient, for example the patient "C" in semi-private room "BC" (Fig. 5A). The patient effects signalling by momentarily pressing the normally open button switch 100C. This closes a circuit traceable from ground through the contacts of switch 100C, patient's bedlamp 104C, winding of relay 103C, contacts of the normally closed call-cancelling push button switch 106BC, conductor 107 to ground through the 24-volt secondary winding of transformer 108 whose primary winding can be supplied with 110-volts from the alternating current mains through the main power switch 109. Relay 103C, when thus energized, closes a locking circuit for itself traceable from the 24-volt conductor 107, contacts of switch 106BC, winding of relay 103C, lamp 104C, to ground through contacts 115C and 102C. At the same time the 24-volt power from conductor 107 is applied through contacts 110C, 111C, to the dome lamp 114BC outside the patient's room. When relay 103C operates, it extends ground from contact 116C, through contact 117C, to the signalling bus 118 which is common to all the rooms, and thence through the winding of relay 119 to the positive terminal of a suitable power supply. The 110-volt alternating current supply may be also rectified and filtered in a conventional rectifier-filter unit 120 for supplying direct current voltage of the desired magnitude to the direct current output bus 123 for operating certain of the relays to be described.

It should be noted that with the exception of the "Remote handset" shown in Fig. 5D, the parts shown in Figs. 5B–5D, are located at the control panel at the nurses' central control point. There can be one of these control panels at each hospital floor, but for purposes of subsequent explanation herein it will be assumed that the particular control panel shown in Figs. 5B–5D is the one on the second floor. When relay 119 operates, it extends ground through its contacts 124, 125, through the call waiting lamp 126 on the control panel, to the 24-volt conductor 107. Lamp 126 is lighted as a signal to the attendant at the central control unit that an unanswered patient is calling. This lamp therefore remains lighted until relay 119 releases, as will be described. At the same time the 24-volt power from conductor 107 is extended through contacts 127, 128 of relay 129, contacts 130, 131 of relay 132, contacts 133, 134 of relay 119, terminal lug 135 on the terminal strip 136, to ground through the various auxiliary dome lamps 137–140 which may be located at predetermined locations, such as diet kitchens, nurses' quarters, nurses' stations and the like. All these lamps are lighted in parallel and give an indication at the various locations that a patient is calling. Also, the 24-volt power is extended through contacts 130, 131, and contacts 133, 134 to terminal lug 135 and thence over conductor F of a six-conductor cable 144 to ground through a buzzer 146 and the normally closed switch 147 which can be mounted in the base of a suitable telephone subset on which rests the usual microphone, earpiece, handset 148. The supporting base for this handset is represented schematically by the dotted rectangle 149 and includes the usual handset controlled cradle switch 150. Also mounted on the base are two push-button controlled switches 151, 152, whose contacts are normally open. When the handset is resting on the cradle the contacts 153, 154, are closed, while the contacts 155, 156 are open. Contacts 157 and 158, contacts 159 and 160, contacts 161 and 162 and contacts 163 and 164 of switches 151, 152, are open. When the handset is removed from the cradle the contacts 153, 154 are opened, while the contacts 155—156 are closed. The handset has built therein a normally open press-to-talk switch 165. The switch 165 when operated closes the circuit through the usual talk-to-listen relay 244 in the amplifier 166 and connects the handset 148 to the input of the amplifier 166. When the switch 165 is not operated the handset is connected to the output of the amplifier. This will be clear from the detailed schematic circuit diagram of the amplifier shown in Fig. 16 wherein the full line and dotted line arrows represent the two directions of signal transmission controlled by the relay 244. It will be understood, of course, that the invention is not limited to any particular kind of switchable amplifier. From the foregoing it will be seen, therefore, that as soon as the patient presses his call button switch 100C, his bedlamp lights, as well as all the various dome lights, and the buzzer 146 continues to operate to give an audible signal, and the call-waiting lamp 126 at the control panel is lighted to give a visual signal.

The control unit also includes an automatic seeking switch 167 (Fig. 5C), which may be of the well-known Strowger or step-by-step type having a set of five rotary brushes or wipers 168–172, and their respective sets of stationary or bank contacts designated A, B, C, D, and E. Merely for illustration, the switch 167 in addition to the normal contact "N" may have 20 contacts in each bank, each set of bank contacts, e. g. all the #1 contacts, being allotted to the respective point or bedroom from which calls can originate. The initial contact in each bank is the normal contact designated "N," and when all waiting calls have been answered the switch 167 automatically restores its five brushes 168–172 to engage these normal contacts. Each patient's bedside unit is represented in switch 167 by its respective five contacts in banks A to E. For example, bedside unit A is represented by the #1 contacts; unit B, by the #2 contacts, etc. Each room has mounted at a suitable location a bedside unit, containing a microphone-loud speaker. For example, in private room "A," this unit is designated 173A; in semi-private room BC, the unit is designated 173BC. Each microphone-loud speaker has associated therewith a single pole double-throw switch 173. When the arm of switch 173 is operated to its upper or "privacy" position, no signals from the unit 173A are amplified in amplifier 166. When it is in the lower position it connects the microphone-speaker 173A over the conductors 174, 175, to the corresponding lugs on the terminal strip 136, located at the central control unit. These lugs on the terminal strips are connected to the bank contacts 178, 179, in banks C and D of the switch 167, and thence over the respective brushes 170, 171, and the conductor pair 170*a*, 171*a*, to the amplifier 166. Amplifier 166 may be of any well-known type, such as is used in intercommunicating systems of the kind wherein the loud speaker unit is also used as a microphone, and wherein a suitable talk-listen relay 244 is also incorporated to control the direction of transmission through the amplifier. The amplifier 166, therefore, can amplify signals originated either at the handset 148 or at the unit 173A, as is well-known in conventional intercommunicating systems.

Similarly each microphone-speaker unit 173BC, etc., in each of the remaining rooms is connected over its conductor pair, for example 180—181, to the respective bank contacts in banks C and D of switch 167 and thence over brushes 170—171 to the amplifier 166. As above described, as soon as a patient, for example in room "BC," makes a call, ground is placed on conductor 118 to operate relay 119 and this same ground is extended over conductor 118 to the normal contact in bank "A." Conductor 118 is multipled to all the patients' rooms so that the normal contact in bank "A" remains grounded so long as there is an unanswered call waiting at any room. If, therefore, the brushes 168–172 are resting on their respective normal contacts, when the patient "C" in room "BC" makes a call, as above described, the said brushes are stepped to the #3 set of bank contacts allotted to said room. For this purpose a circuit is completed from ground on conductor 118, brush 168, conductor 185, contacts 186, 187 of relay 188, conductor 189, interrupter contacts 190, 191, of the switch stepping magnet 192, contacts 193, 194 of relay 195, contacts 196, 197 of relay 198, contacts 198*a*, 199 of relay 188, winding of switch stepping magnet 192, conductor 200, contacts 201, 202 of relay 132, contacts 203, 204 of relay 188, contacts 205, 206 of relay 198, to positive power supply at terminal 207, supplied over bus 123 (Fig. 5C). This same voltage on conductor 200 is also extended through the winding of delay release relay 208 to the above described ground on conductor 185. Magnet 192 and relay 208 operate in parallel. Relay 208 may be relatively slow-to-release so that it remains operated for a slight interval after each break of contacts 191, 192. When magnet 192 is energized, it retracts the conventional driving pawl into engagement with the next succeeding tooth on the toothed wheel to which the brushes 168–172 are connected in the well-known manner. However, these brushes are not advanced to the next position until the magnet 192 is deenergized. When magnet 192 is energized it opens the interrupter contacts 190, 191, breaking the above-identified energizing circuit for magnet 192, thus stepping the brushes 168–172 from their normal contacts to their #1 bank contacts. Since patient "C" is calling, relay 103C is operated and #3 contact in bank "A" is ungrounded, which prevents the switch stepping any further at this time. When relay 208 is operated, it short-circuits the audio output of the amplifier 166 by extending ground through contacts 209, 210, of relay 211 (Fig. 5D), conductor 210a, contacts 212, 213 of relay 208, conductor 213a, to the audio frequency output transformer of the amplifier as shown in Fig. 16. Thus, the clicks or other disturbing noises which may exist due to the stepping action of the switch are not audible at the unit 173BC or in any telephone handset. It should be noted that relay 211 is normally deenergized except when the normally open switch 214 is manually closed, for purposes to be described hereinbelow. Contacts 215, 216 of relay 211, complete the ground return circuits for the cathodes of the amplifier tube 217.

It will be seen that relay 132 operates only when the handset 148 is raised from its cradle to answer a call from any patient's room or when switch 214 is manually closed to apply ground to conductor 219 for purposes to be described hereinbelow. When the handset 148 is lifted, it extends ground through contacts 156, 155, conductor C of the cable 144, directly to the winding of relay 132, which operates. Thus, in order to supply the D. C. operating potential from terminal 207 to the switch stepping magnet 192 and to relay coil 208, when both relays 188 and 198 are normal, relay 132 likewise must be normal. If, under certain conditions to be described hereinbelow, either relay 188 or 198 is operated, then in order to supply the said D. C. potential to magnet 192, relay 132 must also be operated.

From the foregoing, it will be seen that so long as the assumed call from room "BC" remains unanswered, the various dome lights 137–140 remain lighted and the buzzer 146 at the central control panel continues to operate and the call waiting lamp 126 at the central control panel also remains lighted. Likewise, since the switch is in position #3, the ground on brush 172 is connected to the room identification lamp "C" (see Fig. 5C) at the central control panel to indicate that it is patient "C" that is calling. When the handset is raised, the A. C. potential on conductor 107 is applied through contacts 127, 128 of relay 129, contacts 130, 221 of relay 132, contacts 222, 223 of relay 129, conductor 224 to brush 169, thence over its #3 bank contact, conductor 225 to the right-hand end of relay 103C. As described above, the left-hand end of the same winding of relay 103C is also connected to the same potential source thus causing relay 103C to be effectively deenergized and causing it to release. The patient's bed lamp 104C and dome lamp 114BC are extinguished. However, if there is another call waiting at some other patient's room, the call waiting lamp 126 at the central control panel remains lighted since the relay 119 remains operated by reason of the ground which is on the common signal conductor 118. Since it has been assumed that the only call being placed is that from room "BC," relay 119, which had been operated upon placing of the call by the ground on conductor 118, is now released when the switch brushes are stepped to their #3 bank contacts and when the handset 148 is lifted. The dome lights are thus extinguished.

The monitor speaker 226 (Fig. 5D) at the central control panel is connectable into circuit by a double-contact plug 227 and the cooperating socket 228. Associated with socket 228 is a manual switch 230. The circuit for the monitor-speaker 226 is traceable from ground at the secondary winding 166a of the audio output transformer, conductor 213a, socket and plug contacts 228, 227, contacts of switch 230, to ground through contact 239 of relay 132. The amplifier 166 may be of any design well known in the two-way intercommunication amplifier art. As is well known, and as shown in Fig. 5D and Fig. 16, it may comprise a pair of grid-controlled amplifier types 217, 218, and a talk-listen relay 244 by means of which the same amplifier can be used selectively to amplify audio signals transmitted either from a room to the central point, or from the central point to a room. The amplifier 166 also has the conventional power supply connections represented schematically by the power supply transformer 242. Switch 230 provides two modes of operation. When the switch 230 is closed, the monitor speaker 226 is connected to the output of the amplifier 166 at all times, except as noted below. It will be understood that the monitor-speaker is out of circuit whenever relay 132 is operated, that is whenever the handset is off its switch hook. Under certain conditions to be described below, the speaker is connected to the output transformer via contacts 231, 232 of relay 195, and normally closed contacts 233, 234 of the timing switch which is controlled by a cam, 235. In this operation, the speaker is "on," only when relay 195 is energized. Cam 235 is driven by an alternating current motor 236 whose circuit is connected to the 110-volt mains through the contacts 237, 238 of relay 195 when this latter relay is operated. With monitor-unit 226 out of circuit telephone communication is effected by means of this microphone and earpiece in handset 148 which remains connected to the amplifier. The handset 148 is now in voice communication circuit with the microphone-loudspeaker unit 173BC, and by means of the button 165 the nurse can talk to, or listen to, the patient. Relay 244, as shown in Fig. 16, controls the switching of the input and output of the amplifier 166 in the well-known manner. For example, when relay 244 is normal, the signals generated by the unit 173BC are transmitted to the input of the amplifier and the output of this amplifier is fed to the handset 148. When transmission is desired in the opposite direction, the nurse presses button 165 to operate relay 244 which connects the voice frequency currents from handset 148 to the input of the amplifier and also connects the output of the amplifier to the unit 173BC.

Since it has been assumed that no other calls are waiting, when the conversation is terminated the nurse replaces the handset 148 and relay 132 releases. The above-described circuit for magnet 192 is closed through the normal contacts of relays 132, 188 and 198, causing the switch 167 automatically to step itself back to normal under control of the interrupter contacts 190, 191. However, relay 208 remains energized while the switch is stepping back to normal. When the brushes of switch 167 reach normal, since there is now no ground at brush 168 by reason of relay 103C being normal, no ground is applied to interrupter contacts 190, 191, and the switch brushes remain at their normal position, and then relay 208 releases.

When the nurse first sees the dome light of room "BC" lighted, she can respond to the call merely by entering the room "BC" and operating the reset switch 106BC which opens the above-described operating circuit of relay 103C. Relay 103C, upon releasing, extinguishes all the dome lamps previously lighted by the call from room "BC." Also at the central control panel the patient-identifying lamp "C" is extinguished and the buzzer 146 ceases to operate, and all circuits restore to normal.

*Simultaneous calls*

It will now be assumed that a patient in room "BC," for example patient C, places a call, but before the call from patient C is answered at the central point, the patient in room A places a call. The sequence of operation is such that the call identification lamp "*c*" at the central control panel is first lighted as above-described and the talking circuit between the handset 148 is completed to the microphone-loudspeaker unit 173BC, so that the nurse when she lifts the handset 148 must necessarily answer the first call placed, namely that from patient C.

In any event since two patients have placed calls, the patients' bedside switches 100C and 100 are momentarily closed, and the respective relays 103C, 103 are operated and lock up as described above. Likewise, the dome lamps 114BC, 114 are lighted. Ground now being applied to conductor 118, relay 119 operates and causes the remaining dome lamps 137–140 to be lighted and the buzzer 146 to operate. Since it has been assumed that the patient C has placed the call first, and since the brushes of switch 167 can be operated at relatively high speed, when the said brushes are stepped off normal, ground is immediately found at the first and second bank contact sets in bank A, so that the brushes are self-stepped under control of the interrupter contacts 190, 191, to the #3 set which are not grounded and are allotted to the patient C in room BC. This causes the identifying lamp "*c*" to be lighted and the sequence of operation which is described above for a single call then ensues. The call from patient C is taken care of, for example, by removing the handset 148, at which time ground again appears at #3 bank contact, but this ground is ineffective to step the contact by reason of the power circuit for magnet 192 being open at the contact of relay 132. Relay 132 releases when the handset is replaced. However, relays 103 and 119 remain operated as does dome lamp 114, and dome lamps 137—140 are relighted upon replacement of the handset. Likewise, the call waiting lamp 126 remains lighted, and buzzer 146 again operates. Thus, prior to replacing the handset the nurse at the central control panel is given a visual indication that another call is waiting. Upon replacing the handset she is given both audible and visible signals.

As soon as the nurse replaces the handset 148 the power circuit for magnet 192 is closed and the switch brushes are stepped to the bank contact set #4. Since none of the remaining rooms has unanswered calls, their respective relays similar to relay 103 are normal and all the corresponding contacts in bank A of switch 167 are grounded through contacts similar to contact 116, and respective conductors similar to conductor 257, which are connected to the respective contacts in bank A. Therefore, under control of the grounds at the successive contacts in bank A, as well as the ground at the normal contact, the brushes of switch 167 are stepped to the #1 contact set.

Therefore, when the nurse removes the handset 148 from its cradle for the second time, relay 132 operates and relay 103 releases and extinguishes the dome lamp 114, call waiting lamp 126, the remaining dome lamps 137—140, and stops the buzzer 146, as above-described. When the nurse replaces the handset for the second time, after taking care of the call from room A, relay 132 releases and switch 167 automatically self-steps its brushes back to normal. However, if another call is waiting from any other room, the switch automatically stops at the bank contacts allotted to that room since ground is missing at the corresponding contact in bank A. If, for any reason, some terminals in bank A are not allotted to any rooms, they can be directly connected to ground to insure the switch passing them.

It will now be assumed that calls are simultaneously waiting from both patients B and C in room BC and in room A, with patient B calling first, but that a nurse answers the call in room A locally, while the calls from room BC are being answered at the central control panel. It will also be assumed that the calls from room BC were made prior to the call from room A. The sequence of operations for answering a call, for example that from patient C, has already been described. However, while the nurse at the central control panel is taking care of the calls from room BC, another nurse may enter room A to answer the latter call locally by operating switch 106 to break the circuit of relay 103. However, relay 132 remains operated as a result of the nurse at the central control panel having lifted the handset 148. Therefore, dome lamp 114 is extinguished, but relay 103C remains operated and dome lamp 114BC remains lighted since the call from patient C remains unanswered. When the nurse at the central panel replaced the handset after taking care of the call from patient B, for example, the system operates as above described, causing switch 167 to step its brushes to the #3 contact set corresponding to the patient C. When this call is taken care of, the switch 167 steps its brushes back to normal and since the call from room A has meanwhile been taken care of locally, the switch remains in its normal position.

From the foregoing description, it will be seen that all the nurse has to do to answer a call is merely to remove the handset 148 and replace it after the call is taken care of, and each one of a series of waiting calls can thus be taken care of without requiring the usual relatively complicated numerical dialing equipment or relatively complicated arrangement of a multiplicity of manual switches.

While only one central control panel is necessary, it may be advisable to install jacks, such as jack 245 (Fig. 5D), at various locations, which jacks are multipled by respective five-wire cables the conductors of which are designated *a* to *e*. A portable handset 251, having a single push button talk-listen control switch 252 similar to 165 can be carried by a nurse and plugged into the most convenient jack 245, when such a nurse sees a dome light lighted. Let it be assumed that the call originated at room A and the various dome lights are lighted as above described. In response to the placing of the call, switch 167 stops at the bank contacts allotted to room A, as described above. The nurse, noticing the dome light as she is passing, then plugs a convenient handset 251 into the nearest jack 245 and extends ground through contacts 253, 254, conductor A, conductor C to operate relay 132. The operation of relay 132 controls the various functions as described above, including the connection of the power to the amplifier 166. The only difference is that in this case the nurse, instead of being informed of the identity of the calling room by a room-identifying lamp, such as lamp "*a*," must ascertain the identity of the calling room telephonically from the patient. When the call has been answered, the nurse replaces the handset 251, which causes release of the various relays and the automatic restoration of the switch 167 to normal, as hereinabove described.

*Call from nurse to room*

The nurse at the central control panel can establish communication with any room by removing handset 148 and by operating either the push-button switch 151 or the push-button switch 152. The pressing or holding down of switch 152 causes the brushes of 167 to step successively and continuously over the bank contacts allotted to the various rooms, while operation of switch 151 causes the switch to move one step for each successive operation of the switch 151. The continuous stepping operation will be first described, on the assumption, of course, that no room is placing a call. When the handset 148 is removed from its cradle, ground is extended through contacts 156, 155, conductor C, winding of relay 132 which operates. As long as the switches 151 and 152 are normal, relays 188 and 198 remain deenergized. Therefore, the brushes of switch 167 remain on their normal contact sets. However, as soon as the nurse operates switch 152, ground is extended through contacts 163, 164, conductor E, through the winding of relay 188 to power supply conductor 107. With relay 188 operated, ground is extended through contacts 256, 187, conductor 189 through the interrupter contacts 190, 191, contacts 193, 194, contacts 196, 197, to relay 208. On pulling up, the lower contacts of relay 208 complete the ground path through 199 of relay 188 to the stepping magnet 192. The switch 167 makes one step. At the same time the circuit to relay 208 is broken via contacts 190, 191 of coil 192. Relay 208 falls out after a short delay time, an intrinsic quality of this relay, and breaks the circuit to coil 192. The circuit to coil 208 is made once again via contacts 190, 191 on the stepping magnet, and the cycle is completed. By adjusting the relay 208 and/or by adding capacity across the coil, various stepping times may be had. As the switch 167 steps, the room identifying lamps "a," "b," etc., in front of the nurse are successively lighted. When the desired room lamp is lighted, the nurse immediately releases button 152, which causes the relay 188 to release and breaks the stepping circuit for magnet 192. Thus, the switch stops at the desired set of bank contacts and the nurse's handset 148 is placed in telephonic communication through the amplifier 166 with the microphone-loud speaker in the desired room. When the communication has been completed to the desired room, handset 148 is replaced on its switch hook, causing the release of the circuits under control of relay 132 and the restoration of the switch 167 back to its normal contact set.

In some cases, because of the relatively fast stepping action of switch 167, the nurse may not release the button 152 sufficiently fast to stop the switch at the desired point. In order to operate the switch intermittently in its step-by-step action under control of the nurse, the button 151 is operated instead of button 152. When the nurse removes the handset 148, relay 132 operates but the switch 167 does not step from normal until the nurse operates button 151. When button 151 is operated, it closes an energizing circuit through contacts 159, 160, conductor D, to operate relay 198. Ground is thereby extended through contacts 258 and 197 of relay 198, contacts 198*a* and 199 of relay 188, to the stepping magnet 192 and to the relay 208, and thence to battery on conductor 200. Thus, the switch 167 is stepped from normal to its #1 contacts. Even though ground now exists at the #1 contact in bank A, this ground is prevented from further stepping the switch because the contacts 196, 197 of relay 198 are open. Therefore, the switch remains on the #1 contact set until the nurse releases and reoperates button 151 to repeat the foregoing cycle of operations. It is clear, therefore, that the nurse can select any particular setting of switch 167 merely by reoperating the button 151. When the desired communication is completed, the handset 148 is replaced to restore the various circuits and the switch 167 back to normal. Contacts 161, 162, like contacts 157, 158, short circuit the handset to eliminate clicks which would otherwise occur as a result of the operation of the buttons 151, 152.

If calls should be originated during either the intermittent or continuous stepping operations controlled respectively by buttons 151, 152, these calls are prevented from being cancelled even though the handset 148 is not on the switchhook. If either relay 188 or 198 is operated as above described, ground at contact 256 is extended through the winding of relay 129 to the power conductor 107. Relay 129 operates and closes a self-locking circuit at its contacts 129*a*, 129*b*, and contacts of relay 132. Relay 129 at its contacts 222, 223 disconnects the brush 169 of the stepping switch 167 from the power conductor 107, thus preventing release of the respective relays 103, 103B, etc., which have meanwhile been operated as a result of respective calls having been originated. Relay 129 at its contacts 127, 128 also opens the circuit of relay 195. Thus, even though switch 167 executes its successive steps under control of either switch 151 or 152, any calls that have meanwhile been originated will cause the respective relays 103, 103B, etc., to remain operated even though the handset 148 is not on its switchhook.

*Special supervisory scanning*

During the night, or during any other hours, it may be desirable to have the nurse at the central point listen in to the various rooms in succession to ascertain the existence of any abnormal sounds which would indicate that attention is required. For this purpose, switch 259 (Fig. 5B) at the central point is operated, which causes the switch 167 automatically and successively to "scan" each room for a predetermined interval per room, for example ten seconds, under control of the continuously acting timer 235, 236. The operation of switch 259 closes a circuit from ground through contacts 260, 261, winding of relay 195, contacts 128, 127 of relay 129, to 24-volt conductor 107.

When relay 195 operates, ground is extended through contacts 262, 263 of relay 132, timer contacts 233, 264, contacts 265 and 194 of relay 195, contacts 196, 197 of relay 198, contacts 198*a*, 199 of relay 188, winding of magnet 192 and winding 208, to direct current on conductor 200 by way of contacts of relays 132 and 198. This last circuit is closed at fixed intervals by the cam 235, which closes contacts 233 and 264 and opens contacts 233 and 234. Cam 235 does not start to rotate until the motor 236 has its circuit closed through contacts 237, 238 by the operation of relay 195. Thus at each closure of the contacts 237, 238, the switch 167 is automatically stepped to the next contact set.

When relay 195 operates, it completes through its contacts 266, 267, a ground return circuit over conductor 241 to the center tap 242 of the amplifier power supply transformer. At its contacts 231, 232, relay 195 connects the monitor-loudspeaker 226 in circuit with the amplifier by way of contacts 264, 233 on the timer and in succession with each microphone-loudspeaker unit in the various rooms for a period, for example, of ten seconds per room. Each time the cam comes into tripping position it first opens the monitor speaker circuit, thereby preventing clicks. The contacts 242, 243 of relay 208 short circuit the monitor speaker after completion of the cycle, also preventing clicks. If an unfamiliar or unusual sound is heard in the monitor speaker, the nurse need only lift the handset 148, which causes relay 132 to operate and stops further "scanning" motion of switch 167 beyond the room where the sound occurs. More careful listening-in can then be had through the handset 148, and if necessary two-way voice communication can be had with the patient in the room. Upon replacement of the handset, relay 132 releases and the supervising scanning operation is repeated for every successive room. The continuous supervising scanning operation can, of course, be stopped by opening switch 259. If a call should be placed by any room during the above described scanning operation, relay 119 is operated as originally described. With relay 119 operated, the above described circuit for operating relay 195 under control of the scanning switch 259 is broken at contacts 260 and 261, or relay 119. Relay 195, therefore, releases and all the circuits return to normal and the switch 167 executes its automatic seeking action until it reaches the next ungrounded contact in bank A corresponding to a calling station. After all the calls that have come in during the scanning operation have been answered, relay 119 releases and relay 195 reoperates to cause the scanning to be resumed.

*Automatic skipping*

It is desirable in order to save time during the above described scanning operations to cause the switch 167 to "skip" over the unused contact sets which may be located between other used contact sets wired to respective rooms. Under certain circumstances it may be desirable to place one or more sets of normally wired or used contacts in switch 167 temporarily out-of-service, and here again it is desirable to have the switch 167 "skip" over this temporarily out-of-service contact set. For this purpose, all the unused contacts on the "A" bank of switch 167, for example contacts 11, 12, 15, 16, are directly grounded. Furthermore, all the corresponding unused contacts in the "E" bank are multipled to a conductor 129c, which is connected to the winding of relay 129. Consequently, when the brushes of switch 167 arrive at a dead or unused contact set, relay 129 is immediately energized by ground from brush 172 through the said unused contact in bank "E," thence over conductor 129c. As a result of the operation of relay 129, the energizing circuit for relay 195 is broken at the contacts 127, 128 of relay 129, and relay 195 releases. As a result of the release of relay 195, all the circuits immediately return to normal and the switch 167 automatically steps itself by reason of the grounds on the unused contacts in bank A. When the brushes of switch 167 reach the next ungrounded contact in bank "A," relay 129 releases. Thereupon the energizing circuit for relay 195 is again closed through the contacts of switch 259 and the timed scanning action of the switch 167 is resumed under control of the timer 235, 236. This avoids the necessity of the switch staying at each unused contact set for the period of time fixed by the timer.

Referring to Fig. 5C, Fig. 14, and Fig. 15, it will be seen that the room-identifying lamps, *a, b, c*, etc., at the central panel are of the conventional metal shell bayonet pin type, such as are conventionally used on instrument panels and the like. Each lamp has the usual bulb 520 enclosing the filament 521, and is attached to a metal base 522 carrying the usual prong or pin 523 which is arranged to register and lock with the corresponding L-shaped slot in the metal shell socket 524 to insure the proper contact between the lamp prongs 525 and the resilient contacts 526 in the socket. As shown schematically in Fig. 5C and Fig. 14, all the metal shells 524 are connected together and thence to relay 129.

Should it be desired to place a room out of service all that is necessary is to remove the corresponding lamp, for example lamp *a*, from its socket and to insert in place thereof a keyed metal plug 527 which has a radially extending key or pin 528 for registry with the L-shaped bayonet slot in the lamp base 524. Thus, the said keyed plug 527 can be inserted in only one definite relation with respect to the socket contacts. The upper portion of plug 527 is round and approximately the same diameter as the lamp base. However, the lower portion of the plug is cut away at 529. Thus, when plug 527 is inserted in place of a removed lamp, the metal shell 524 is directly connected to the socket contact 526 which, in turn, is wired to the corresponding contact in the "E" bank. Therefore, when the brush 172 engages the #1 contact, for example, in the "E" bank, a circuit is completed through the plug 527 to conductor 129c causing the operation of relay 129 and thus instantly stepping the brushes of switch 167 to the next contact set.

*Preventing accidental cancellation of calls*

It will be recalled that cancellation of a call from any room is effected by short circuiting the room relay 103 to the "high" side of the power supply through the corresponding contacts in bank "B" of switch 167 and the associated brush 169, conductor 224, contacts 222, 223 of relay 129, contacts 221, 130 of relay 132, and contacts 127, 128 of relay 129. It will also be recalled that in order to call a patient from the central point, the handset at that point must be removed from its switch hook and the button 151 or the button 152 must be depressed. The operation of button 151, for example, causes relay 198 to operate and the switch 167 automatically skips, as is explained under the above heading "Call from nurse to room." During this operation relay 129 operates over a circuit traceable from the power conductor 107, winding of relay 129, contacts 198a, 198b of relay 198 to ground at contact 256. When relay 129 operates it breaks the above described short circuiting condition extending through the contacts in the "B" bank of switch 167, thus preventing dropping out of the various room relays which have been meanwhile operated as a result of placing calls. Relay 129, when operated, closes a locking circuit for itself, traceable through its own contacts 129c, 129b, and contacts 262 and 262a of relay 132. This prevents cancellation of a room call even though either the button 151 or button 152 is released, because relay 129 remains locked until the handset 148 is replaced on its switch hook. If it were not for this operation of relay 129, the above-described short circuiting condition through the contacts of bank "B" would always be complete when the handset 148 is removed and each call would be cancelled as the switch 167 passes over its associated contacts.

*Special function signal*

At certain times, or under certain conditions, it may be desirable to transmit to each room a special signal, for example a fixed audio frequency note to inform visitors or others of the termination of visiting hours, or for any other purpose. For this purpose the normally open manually operable switch 214 (Fig. 5D) is momentarily closed or it may be kept closed. In the momentary operation the special signal is transmitted until all rooms have received it, whereupon the special signal transmission is terminated. In the permanently closed position the operation is continuously and cyclically repeated. In the momentary operation of switch 214, relay 214a is operated and locks through its contacts 214b, 214c, conductor 214d, and the normal contact "N" on the "E" bank of switch 167. Therefore, relay 214a releases as soon as the switch 167 steps off normal. When relay 214a operates, an obvious operating circuit is closed for relay 211 through contacts 214e, 214f of relay 214a. Relay 211 also locks through its own contacts 211a and 211b. The remaining contacts on relay 211 effect circuit operations similar to those resulting when button 152 is depressed and as described hereinabove under the heading "Call from nurse to room." The special signalling tone may be derived from an oscillator, to be described hereinbelow, which is connected through normally closed contacts 269, 270. At contacts 209 and 210 of relay 211, the above-described short-circuiting of the audio frequency circuit is avoided. Therefore, when relay 211 is operated, as above described, it results in completion of the tone transmission circuit. At this time the special room signal is not reproduced in the monitor-speaker. At the same time an operating circuit is closed for relay 132 traceable over conductor 219, contacts 209 and 282 to ground. The operation of relay 132 completes the amplifier power supply circuit by connecting ground through contacts 239, 240 and conductor 241 to the mid-point of the power supply transformer winding 242. Relay 211, by opening its contacts 215 and 216, breaks the cathode return circuit of the first amplifier tube 217, thereby preventing feedback and undesired interaction of controls. Relay 211 also extends ground through its contact 216 and thence to the winding of the talk-listen relay 244, which thereupon operates to permit the amplifier to transmit audio signals in a direction toward the various rooms. The control grid of amplifier tube 218 is connected by means of a shielded conductor to the neon tube oscillator 268, one electrode of which is directly grounded and the other electrode of which is grounded through contacts 269, 270 when relay 211 is normal. This latter circuit effectively prevents the oscillator 216 from generating oscillations. One of the electrodes of the neon oscillator is also connected through a fixed resistor 271 and the adjustable resistor 272 to a tap 273 on the voltage divider 274. The tap 273 is also connected to ground through a condenser network comprising condensers 275, 276, whose common connection is coupled through condenser 277 and a volume control resistor 278 to the control grid 279 over the shielded conductor 280. The neon bulb 268 in the well known manner acts as an audio frequency oscillator whose frequency can be adjusted for example to 2,000 C. P. S., by moving the contact arm along resistor 272, and the amplitude of this tone can be controlled by adjusting the contact arm on resistor 278. Therefore, when relay 211 operates it removes the short circuit from the oscillator 268 and the tone is amplified in tube 218 and the amplified tone appears at the output of amplifier 166.

It should be observed that during the above-described operation corresponding to the momentary actuation of switch 214, relay 211 remained locked until the switch 167 returned to its normal position. In the meanwhile, of course, relay 214a has been released and therefore the ground on brush 172 is extended over conductor 214d and thence through contacts 214g, 214e to short circuit relay 211 which thereupon releases. This stops any further recycling of the switch 167 and terminates the transmission of the special tone. If, on the other hand, switch 214 is maintained closed, relay 214a remains operated when the switch completes one complete cycle of tone transmission. Therefore, the above-described short circuit for relay 211 does not exist and the switch 167 continues to step, and the tone transmission is cyclically repeted to all the rooms so long as switch 214 is closed.

*Time-totalization of unanswered calls*

The system is so designed that a continuous check is kept of the total time that a call or calls are waiting to be answered, and the corresponding central station is not being attended to. As described hereinabove, power on conductor 107 is applied through contacts 127, 128 of relay 129, contacts 130, 131 of relay 132, contacts 141, 142 of relay 119, to lug 143 which is cross-connected to a similar lug 143a (Fig. 6), on another terminal strip, which lug, 143a, is connected to ground through the winding of a relay 143b. Relay 143b, therefore, operates whenever relay 119 is operated and whenever relay 132 is normal, that is, while a pre-existing call is not answered. Relay 143b at its contacts 143c, 143d, completes a 110-volt alternating current circuit through the winding of a suitable "running-time" meter 143e. This meter may be located either at the central control point or at any other suitable location.

As soon as a call is answered by the nurse picking up the handset 148 or 251 (Fig. 5D), or by a nurse cancelling the call by pressing switch 106 in the patient's room, relay 132 operates and breaks the circuit of relay 143b which releases. Therefore, meter 143e records the total time duration, for example in minutes, that calls are waiting to be answered and the corresponding central station is not being attended to.

*Master remote (head nurse monitoring)*

In the foregoing descriptions of the central control panel, only one central panel has been referred to, namely that on the second floor, but it will be clear that each floor of the hospital may be equipped with a similar central control panel. It is important, therefore, to provide a head nurse or similar official with supervision over these respective central panels on the various floors. Thus, the head nurse's station can monitor visually all the central control panels at the various floors; and also the head nurse is enabled to answer directly any calls originating at any room on any floor.

For these purposes the head nurse's station (Fig. 7) is provided with a suitable panel or housing which includes a four-brush manually operable switch 300 (Fig. 7) having the four brushes 301–304 ganged for unitary operation, and an additional switch arm 305 which is so mechanically connected to the operating handle 306 that while that handle is being moved from one position to another the circuit through the associated fixed contact is kept open. This prevents accidental cancellation of unanswered calls at any floor, other than the floor which the head nurse selects to answer calls at the time. A simple arrangement is to have switch 305 of the protruding push button kind, the button being spring-pressed up so as to be in the path of the knob 306. Thus knob 306 cannot be turned from one position to another without first operating switch 305, which should be held operated, to open contact 307, until the desired selected position is reached.

The head nurse's position also includes a 2-way or talk-listen telephone handset 308 which, when not in use, rests on its cradle switch 309 to maintain the switch hook contacts 310, 311 open. As will be seen in Fig. 5B, each central panel on a floor has a terminal strip 312 carrying a set of cross-connection lugs to which conductors 313–318 are connected. Likewise at the head nurse's position there are a series of similar terminal strips 319, 320, etc., one for each floor. Merely for illustration, only the terminal strips for floor #2 and floor #3 are shown in Fig. 7, it being assumed that the central floor panel equipment shown in Figs. 5B–5D is that located on the 2nd floor. The lugs on strip 312 at the 2nd floor panel are cross-connected to the corresponding lugs 313a–318a on terminal strip 319 at the head nurse's position. Likewise the lugs on the terminal strip at the 3rd floor panel (similar to strip 312) are cross-connected to the corresponding lugs on strip 320 at the head nurse's position, and so on for the remaining floors.

The head nurse's position also has a series of floor indicator lamps 321, 322, etc., one for each floor, which light up whenever there is any unanswered call at the respective floor. Thus lamp 322 for floor #2 is connected to lug 313a and also to the corresponding lug at the 2nd floor central panel 312 (see Fig. 5B), which latter lug is supplied as hereinabove described with potential over conductor 107 and through contacts of relays 132 and 119 as long as any call is unanswered at floor #2 and handset 148 is on its cradle. In other words, lamp 322 remains lighted as long as any dome lamps 137–140 on floor #2 are lighted indicating that there are calls waiting at the 2nd floor and the central station thereat is not attending to them.

Let it be assumed that unanswered calls are waiting on floor #2 and floor #3, in which case lamps 322 and 323 are lighted. The head nurse can answer the 2nd floor call by actuating switch 305 and turning selector switch 300 to its #2 position. The above-described audio transmission and amplifying circuits are, therefore, completed when the handset is raised since lugs 316a and 317a are cross-connected to the corresponding lugs on strip 312, which latter lugs are also connected over conductors 316, 317 to wires *d*, *e* (Fig. 5D). The head nurse's telephone set 308 is thus connected in parallel with the telephone set 148 at the 2nd floor central panel by means of brushes 303, 304 and the respective stationary contacts. The contact 325, which is engaged with brush 302, completes the path for the press-to-talk switch 326 which thereby functions similarly to switch 165 (Fig. 5D), as above-described.

The head nurse, by removing the handset 308, thereby completes the circuit for operating relay 132 (Fig. 5D) by means of ground through contacts 305, 307, 311, 310, brush 301, contact 327, conductor 314a, lug 314 (Fig. 5B), and thence through the winding of relay 132. For all practical purposes, therefore, the head nurse's handset 308 may be considered as the equivalent of the above-described remote handset 251, and it is now temporarily connected to the 2nd floor central panel.

It has been mentioned above that the switch 305 is necessary to prevent undesired cancellation of calls and that it breaks the circuit to the telephone cradle switch 309 while switch 300 is being adjusted. In order to understand this action let it be assumed, first that switch 305 is omitted; that unanswered calls exist on the 2nd and 3rd floors and the head nurse wishes to answer the call on the 3rd floor first; and let it also be assumed that switch 300 is in its normal or "off" position. Under those assumptions, if the nurse removed the handset 308 and proceeded to rotate switch 300, it would on reaching the 1st position (#2) immediately complete the circuit to relay 132. The contacts 221 and 130 of that relay would then complete an alternating current path by way of contacts 222, 223 of relay 129 over conductor 224 to the "B" bank of switch 167 which would short circuit the relay 103 of the room at which the switch 167 is set. Therefore, after removing the handset 308 and turning the switch 300 to position #3 and through position #2, the head nurse would unintentionally cancel the unanswered calls on the 2nd floor without their being taken care of. However, by providing switch 305, which must be open while switch 300 is being adjusted, the circuit for relay 132 is broken in any event, thereby precluding accidental cancellation of calls.

*Master sub-station (head nurse call to floor centrals)*

The system is also arranged that the head nurse can call the central points located at any of the floors. In general, the head nurse's call is registered at the desired floor central panel, similarly to the registering of a patient's room call as hereinabove described. At the head nurse's position there is provided an additional manually operable selector switch 400 (Fig. 8), comprising 6 rotatable brushes 401–406, with respective sets of fixed contacts. The first fixed contact of each set is the normal or "off" position and the succeeding fixed contacts are connected to respective lugs on respective terminal strips, 407, 408, etc., one for each floor. Switch 400 also has its brushes ganged to a rotary contactor disc 409 having a fixed grounded wiper 410, and a series of equally spaced wipers 411–417, equal in number to the number of floors to be supervised. Brushes 411–417 are connected respectively and directly to the corresponding fixed contacts that cooperate with brush 406. It will also be noted that the disc 409 has a cut-out or notch 418 of an arcuate length which is slightly less than the spacing between adjacent wipers 411—412, etc., so that when the operating knob 419 of the entire switch is centered on any given selected position, all the wipers of the set 411–417 are grounded, except that particular wiper corresponding to the desired setting. The switch is shown in Fig. 8 in its 2nd floor position so that wiper 413 is ungrounded. Associated with switch 400 is a microphone-speaker 420, a relay 421, a lamp 422, and a toggle switch 423. All this equipment may be housed in a suitable removable casing 424 (Fig. 9) for ready assembly or location at the head nurse's position.

For explanation, let it be assumed that the head nurse desires to communicate with the central control panel on the 2nd floor. She therefore turns knob 419 to adjust switch 400 to position #2. In that position the microphone-speaker 420 is connected by way of brushes 401, 402 and respective contacts 425, 426, audio frequency line conductors 427, 428 to lugs 429, 430 on the terminal strip 408, which lugs are also cross-connected over conductors 429*a*, 430*a* to the appropriate stationary contacts in the seeking switch 167 (Fig. 5C) which particular contacts are allotted to the head nurse's station, for example contact sets #10. Brush 404 connects one end of the winding of the relay 421 to lug 107*b*, which is cross-connected to the 24-volt A. C. conductor 107. The head nurse then depresses button 423 which completes the circuit through relay 421, which relay locks itself up through its own contacts 431, 432 and lamp 422. When relay 421 operates it extends ground through its contacts 433, 434, brush 405, to lug 435, which is cross-connected over conductor 118 to lug 435*a* at the terminal strip 136 (Fig. 5B). This ground at the lug 435*a* causes relay 119 to operate and also causes the switch 167 to step off normal and to hunt for a non-grounded contact in its bank "A." It should be observed that when relay 421 is normal this same ground is extended through brush 406 to lug 436 which is connected over conductor 436*a* to a corresponding bank contact in bank "A" of switch 167, which contact is allotted to the head nurse's station. Therefore, the switch 167 stops when it reaches the ungrounded contact, corresponding to the head nurse's station.

It should also be observed that the contactor disc 309 keeps the ground on the contact which is allotted to the head nurse's office in all the "A" banks of the respective switches 167 at all of the remaining floor centrals, except the 3rd floor central which is being called by the head nurse. This permits all the central stations on the remaining floors to proceed with their various normal functions as hereinabove described, so that the only floor central which is under control of the head nurse at this particular setting of switch 400 is on the 2nd floor central.

When the 2nd floor central switch 167 finds the non-grounded contact corresponding to the head nurse's station, buzzer 146 at the second floor central panel has its circuit closed under control of relay 119, as described above for the placing of a coil from a patient's room to the 2nd floor central. The nurse at the 2nd floor central station, therefore, receives an audible indication that a call is being placed. The central panel at the 2nd floor, as is true on all the remaining floors, has a head nurse identifying lamp 437 (Fig. 5C), which is connected to a corresponding contact in switch bank "E." Thus, both an audible and visual indication are given at the 2nd floor central panel that the head nurse is calling. When the nurse at the 2nd floor central removes the handset 148 from its cradle the circuits at that particular central station function in the same manner as described above for the answering of a call originating from a patient's room.

As a result of the removal of the handset 148, the 24-volt potential is applied from conductor 107 (Fig. 5B), contacts 127, 128, 130, 221, 222, 223, conductor 224, switch brush 169, to the corresponding contact in bank "B," which is connected over conductor 438*a* to lug 438 (Fig. 8). Lug 438 is connected through brush 403 to one end of the relay winding 421. Since this same potential is now applied to both ends of the relay winding, relay 421 releases and performs substantially the same function as the release of one of the room relays 103, as hereinabove described. When the communication between the head nurse and the 2nd floor nurse has been completed, the 2nd floor nurse replaces the handset 148 which causes the switch 167 at the 2nd floor central to automatically return to normal or to hunt for the next awaiting call at the 2nd floor. The call from the head nurse to the 2nd floor central may also be cancelled at the head nurse's station by simply turning the switch 400 to a new position or, preferably, to the "off" position.

*Operating room control*

The system is arranged so that doctors and other operating room personnel can communicate directly from the operating room with the central station on any floor and can carry on a 2-way conversation. However, once the call has been completed and the nurse at the called floor central replaces the telephone handset on its cradle, the central station at that called floor is prevented from calling the operating room. In other words, communication between the operating room and the several floor centrals can only be established by a call originating at the operating room. This prevents startling of the operating room personnel.

Fig. 10 shows the schematic wiring of the system as applied to the control station in an operating room or similar critical point. It includes a microphone-speaker 450, which serves for 2-way communication to any one of the desired floor central stations. Each floor central is represented at the operating room station by a corresponding explosion-proof switch 451–456. Each such switch is associated with two relays 457, 458, which may be located in a separate box 459 external to the operating room. Each of the remaining switches 452–456 is connected to a similar pair of relays but only the wiring for the pair of relays for the 1st floor switch is shown in detail in Fig. 10. The individual at the operating room who wishes to call a central station, for example on the 1st floor, depresses the momentary switch 451 which extends ground through the winding of relay 457 to the A. C. bus 107. Relay 457 locks up through the contacts 461, 462 of relay 458 to ground through contacts 463, 464. Ground is also extended through contacts 465, 466 to lug 467 which is connected to the signalling bus 118 (see Fig. 5A) to cause the switch 167 at the 1st floor central station to operate and seek the first ungrounded contact in its "A" bank, as described hereinabove. The particular contact in bank "A" allotted to the operating room is cross-connected to lug 468 so that when relay 457 operates it disconnects the ground and causes the switch 167 to stop at the position allotted to the operating room. The various lamps, including the dome lamps on the 3rd floor, are lighted exactly the same as if a local call from a patient's room had been initiated and the buzzer 146 operates, and at the same time the lamp 469 at the 1st floor central panel is lighted to indicate that the operating room is calling. The nurse answers this call in the normal manner by removing the telephone handset from its cradle. On doing this the A. C. potential is applied by way of contacts 127, 128 of relay 129, contacts 130 and 221 of relay 132, contacts 222, 223 of relay 129, conductor 224 to brush 169 and thence to the appropriate contact in the "B" bank which is cross-connected over conductor **470*a* to lug 470 at the operating room terminal strip 471 (Fig. 10). This potential extends through the contacts 472, 473 through the winding of relay 458 which thereupon operates and locks through its own contacts 474, 475. At the same time the previously described locking circuit for relay 457 is broken and that relay releases. Speaker 450 is thus connected through contacts 476–477 and 478–479 to the lugs 480, 481, which are cross-connected over conductors 480*a*, 481*a* to the corresponding terminals in the "C," "D" banks of the switch 167, thus providing a 2-way audio frequency communication circuit between the operating room and the selected floor central station. When the nurse at the selected floor central replaces the telephone handset, the A. C. potential is removed from terminal 470 and relay 458** releases.

It should be observed that relay 458 cannot be energized unless relay 457 is first locked. This action can only be accomplished by the corresponding switch 451. Since audio frequency communication circuit must be completed by way of normally open contacts of relay 458, the floor central station has no way of independently originating a call to the operating room. It should be observed that at a convenient point in the operating room there is provided a signal lamp 530, one terminal of which is connected to the power conductor 107. The other terminal of this lamp is connected to ground through contacts 531, 532, whenever relay 457 is operated. This same circuit is also closed to maintain lamp 530 illuminated if any of the corresponding remaining relays **457*a*–457*e*** is operated. This notifies the personnel in the operating room that the call from the operating room to the selected floor central has not yet been cancelled by the response of the nurse at the said selected floor.

*Voice-operated relay*

In the foregoing descriptions the 2-way communication circuit is controlled by a press-to-talk switch, such as switch 165, which forms part of the telephone handset. In order to avoid the use of that particular type of switch, there is shown in Fig. 11 a circuit wherein switching is controlled by the mere speaking into the handset at the central station. In other words, whenever the nurse speaks into the handset the talk-listen relay 244 operates and arranges the input and output circuits of the voice amplifier 166 for transmission from the central station. Referring to Fig. 11, the microphone **148*m* is connected to the push-pull input of an amplifier tube 481 which together with the network 482, forms a balanced differential circuit, which provides a single-ended output. This arrangement is used to prevent line noises from accidently tripping the talk-listen relay and it also obviates the need of a special input transformer for tube 482. Noises picked up on the microphone line are fed in phase to both control grids 483 and 484 thereby cancelling out. The signal generated in the microphone, however, is fed to the grids 483, 484 out of phase and, therefore, these out of phase components do not cancel out. The normal position of the talk-listen relay contacts is such that the input and output circuits of amplifier 166** are arranged for transmission in a direction from the local stations.

When the nurse speaks into the microphone **148*m*, the audio frequency voltage is amplified in a conventional relay amplifier 481*a* and rectified by the rectifier 487, which preferably should be a vacuum tube rectifier. The resulting D. C. voltage is applied across the resistor 488, reducing the bias on the control grid 489 of the relay tube 490. This tube is normally biased to plate current cut-off so that when the rectified signals are applied to grid 489, tube 490 becomes conductive and the plate current thereof flows through the winding of the talk-listen relay 244 causing it to operate. The variable resistors 491, 492 are sensitivity adjustments so as to control the amount of microphone signal necessary before relay 244 will trip. The time constant circuit composed of condenser 493 and resistance 488 is chosen so that relay 244 will hold up for a short interval after the nurse stops speaking. This is done to preserve the continuity of the speech which would otherwise be lost during pauses. However, this time-constant circuit is so arranged that the relay 244** operates in a minimum time. This is necessary to prevent the loss of the first syllable or word and is accomplished by employing large values of amplification and a quick acting relay.

*Time delay for head nurse's signal*

It may be desirable to avoid the display of a signal at the head nurse's station each time a call from a patient's bedroom is unanswered at the respective central station. For example, the nurse at the central station may observe the visual signal produced by the calling room lamp or by the buzzer 146 but may not be able to answer the call immediately. The system is arranged, therefore, that at the head nurse's station (see Fig. 7) a signal lamp 511 is provided which is controlled by a relay 508. However, the lamp 511 is not lighted until a waiting call at an unattended central station remains unanswered for a predetermined period. In order to achieve this latter object a delay circuit may be employed for controlling the relay 508. A preferred form for effecting this delay is shown in Fig. 12. As soon as a call is placed by a patient, relay **143*b* is operated as described above in connection with Fig. 6. This relay completes a 110-volt A. C. circuit to the motor 500, which drives a timing cam 501. When the low part 502 of the cam registers with the spring 503, the contacts 504 and 505 are closed and extend ground through contacts 506, 507 controlled by switch hook which supports the head nurse's handset 308, and thence through the winding of relay 508 to terminal 143*a*. Thus the relay 508 operates when the waiting call at an unattended central station is unanswered for the predetermined period controlled by cam 501. Thereupon it closes an obvious circuit through its contacts 512, 513. When the head nurse removes the handset 308, the locking circuit for relay 508 is broken thereby cancelling the call and causing relay 143*b* to release. This results in the stopping of motor 500 and the cam 501 returns to its normal position. If the call should be answered from another point before the spring 503 falls in the notch 502, the motor 500 is stopped since the initial energizing circuit of relay 143*b*** is broken and the cam is returned to its normal position.

Fig. 13 shows in generalized block diagram form the complete system according to the invention and the operations of the various parts illustrated in Fig. 13 and referred to therein have been described in detail hereinabove.

While certain particular embodiments have been described herein, various changes and modifications can be made therein without departing from the spirit and scope of the invention.

The expression telephone set as used herein covers the conventional desk-type handset or any other well-known form of handset, whether employing separate microphone and reproducer units or using a single composite microphone-reproducer unit, and regardless of whether these units are designed for loudspeaking or non-loudspeaking use. Furthermore, the invention contemplates the use of either so-called self-powered telephone sets or so-called battery-operated telephone sets.

What is claimed is:

1. In a combined visual and audible communication system, a plurality of local stations, a central station, a manual switch at each of said local stations responsive to a single manual operation thereof to transmit a call-initiating signal to the central station, a telephone set at the central station, a single multi-point automatic seeking switch, circuit connections automatically effective in response to the operation of said manual switch to cause said seeking switch to seek the local station placing the first call, a telephone set at the central station for 2-way communication with the calling station, other circuit connections effective substantially immediately in response to the restoration of said set to out-of-use condition after response to said first call for causing said seeking switch automatically to seek the next local station which had placed a call while said set was previously in use in responding to said first call and additional circuit connections at said central station for selectively directing said switch to complete a 2-way communication circuit to any desired one of said local stations.

2. In a system of the kind described, a central station, a series of local stations from each of which a call-initiating signal can be separately transmitted to said central station, a plurality of visual indicators at the central station for respectively identifying said local stations, an indicator at said central station which remains operated as long as a call-initiating signal from any local station remains unanswered at the central station, a single automatic stepping switch having a plurality of bank contact sets one set for each local station, means responsive to said call-initiating signal to cause said stepping switch to step to the bank contact set corresponding to the particular local station from which the first call-initiating signal originated and to operate only the corresponding visual indicator at the central station, a 2-way telephone answering set at said central station, means responsive substantially immediately to the replacement of the said set on its support after the call from the first station is answered to cause said stepping switch to step to the next bank contact set corresponding to the next local station from which an unanswered call originated and to operate only the visual indicator corresponding to said next local station, and circuit connections at said central station for selectively directing said switch to complete a 2-way communication circuit to any desired one of said local stations.

3. The combination in a telephone and visual signal communication system for use in a multi-section area, each section of the area having a two-way telephone set and a call-initiating switch and a call-control relay, circuit connections to lock a call-control relay in response to a momentary operation of the associated call-initiating switch, a series of lamps at the central station each identifying one of said sections, a single automatic stepping switch for connecting said central station with any one of said sections, means at said central station for displaying a visual signal when any of said call-control relays is operated and for illuminating only one of said lamps at a time, a 2-way telephone set at said central station for answering calls from said sections, means effective substantially immediately when said telephone set at the central station is replaced after answering a previous call from one of said sections to cause said switch automatically to seek the next section originating a call and to cause only its corresponding section-identifying lamp to be lighted, and circuit connections at said central station for selectively directing said switch to complete a 2-way communication circuit to any desired one of said local stations.

4. In a 2-way intercommunication system for hospitals and the like, comprising in combination a plurality of 2-way telephone sets located in respective rooms, a central supervisory telephone handset and handset support, a single multi-point automatic seeking switch, electric motor means for operating said switch, circuit connections rendered effective merely by the repeated lifting and replacement of said handset on its support for energizing said motor means to cause said switch to hunt for and seize successive sets of bank contacts leading to respective rooms from which calls have been placed, and additional circuit connections at said central station for for selectively directing said switch to complete a 2-way communication circuit to any desired one of said local stations.

5. A paging and 2-way intercommunication system according to claim 4 in which said seeking switch has a pair of brushes and cooperating bank contacts for completing a 2-way telephone circuit to any desired one of said rooms, a 2-way amplifier in circuit with said brushes, a relay for controlling the electric power to said amplifier, and circuit connections for operating said relay in response to said lifting of said handset.

6. In a system of the kind described, a plurality of local stations each having a call-initiating control relay and a manual switch for operation of said relay, a central station having a telephone handset, an answering relay at the central station common to all local stations and operated in response to said handset being taken into use to answer a call, a single automatic seeking switch, motor means for operating said seeking switch, a circuit effective each time said telephone handset is taken into use and replaced after use for energizing said motor means and controlled through contacts of said answering relay and through contacts of said call-initiating control relays when successively scanned by said seeking switch, and additional circuit connections at said central station for selectively directing said switch to complete a 2-way communication circuit to any desired one of said local stations.

7. In a system of the kind described, a plurality of local stations, a central station, an automatic seeking switch, means controlled from said central station for selectively directing said switch to scan successively the various local stations and to complete a transmission circuit to each local station for listening in to noises at said local station, and means effective when any local station places a call during said scanning operation to cause said switch to seek the contacts allotted to the said local station.

8. A system according to claim 7 in which means are provided for causing said switch automatically to resume its scanning operation after said call has been answered at the central station.

9. A system according to claim 7 in which an automatic timer is provided for causing said switch during its scanning operation to stop for a predetermined interval at the successive sets of bank contacts allotted to respective local stations.

10. In a system of the kind described, a plurality of local stations, a central station, a telephone set at the central station, a first manual switch and a second manual switch at said central station, an automatic stepping switch controlled by either of said manual switches for selectively connecting said central station to said local stations in succession, means including an operating circuit for said switch and responsive to calls from local stations and effective when neither of said manual switches is operative to cause said switch to step to successive bank contact sets allotted to respective local stations until all waiting calls from said local stations have been answered at the central station, means responsive to the repeated intermittent operation of said first manual switch to cause said switch to correspondingly intermittently step to successive bank contacts, means responsive to a single operation of said second manual switch to cause said switch to continually and automatically step to successive bank contacts, and additional means effective when a local station is placing a call while either of said manual switches is operated to terminate any further stepping of said switch when it reaches a position corresponding to the station placing said call.

11. In a system of the kind described, a plurality of local stations, a central station, an automatic seeking switch, means controlled from said central station for causing said seeking switch to scan successively the various local stations and to provide a 2-way telephone path between the central station and each of said local stations in succession, a signal generator at the central station, and manually controlled means at the central station for causing said generator to transmit a special signal to each local station in succession during said scanning.

12. A system according to claim 11 in which said 2-way path includes a normally ineffective amplifier, and a relay at said central station for rendering said amplifier effective to transmit said special signal when said switch begins its scanning operation.

13. In a hospital paging and intercommunication system, a plurality of patient's rooms each having a bedside call-control switch and 2-way intercommunication unit, a dome lamp for each room and which is lighted in response to a patient in the room placing a call, a plurality of auxiliary dome lamps located at other points throughout the hospital, means effective when any patient places a call to light all said dome lamps, a central station having a telephone set, circuit controlling contacts operated by said telephone set when taken into use to answer a call, an automatic seeking switch, an operating circuit for said switch, circuits controlled by any of said call control switches for causing said automatic switch to seek a calling patient's line to selectively connect his intercommunication unit with the central station, a jack multipled to said circuit controlling contacts of said telephone set at said central station, and additional circuit connections effective when either said telephone set at the main station is taken into use to answer a call or when any auxiliary telephone set is plugged into said jack, to break said switch operating circuit and thereby to stop further movement of the said seeking switch until the said set is taken out of use.

14. A system according to claim 13 in which each bedside control unit includes a dome lamp control relay, and circuit connections for operating the dome lamp control relay to extinguish the dome lamp at the particular room at which said seeking switch stops, but without permanently extinguishing the remaining dome lamps if an unanswered call exists from any other room.

15. A system according to claim 13 in which at said main central station there are provided a series of respective bedside-unit identifying lamps, and circuit connections for lighting each of said identifying lamps one at a time corresponding to each stopping position of said switch.

16. A system according to claim 7 in which means are provided for holding said switch for a predetermined time interval at each position which is wired to a local station, and additional means are provided for automatically causing the switch to skip contact sets which are not wired to local stations.

17. In a combined visual and audible communication system a plurality of local stations, a central station, means at each local station for transmitting a call-initiating signal to the central station, a single multi-position automatic seeking switch, circuit connections automatically effective in response to said signal to store the same until said switch seeks and finds the contact set allotted thereto, means controlled from said central station for causing said seeking switch to scan continuously said local stations in succession, and means to prevent the wiping out of the stored signals corresponding to any stations which have placed calls during the time said switch is executing its scanning operation.

18. A system according to claim 11 in which said central station is provided with a monitor sound reproducer, means for connecting said reproducer in circuit between the central station and said local station when 2-way communication is established therebetween, and additional means for disabling said reproducer during the said transmission of said special signal.

19. In a combined visual and audible communication system, a central station, means at each local station for transmitting a call-initiating signal to the central station, a multi-position automatic seeking switch, circuit connections automatically effective in response to said signal to cause said seeking switch to seek the particular local station from which said signal is transmitted and simultaneously to display at the central station the identification of said particular station, and means to indicate the total time elapsing between call initiation and the answering thereof by said central station.

20. In a calling and 2-way communication system for hospitals and the like, comprising a plurality of floor-nurse central stations, a head nurse's station, a plurality of patients' local stations, means including an automatic seeking switch at each central station and controlled from any local station associated with a central station for displaying at said central station the local station identification until the call is answered at said central station, and for producing a call-waiting signal indication at the head nurse's station, and means to delay said signal indication until the elapsing of a predetermined time after the call has been placed.

21. A calling and 2-way communication system according to claim 20, in which the said head nurse's station is provided with means for establishing a 2-way communication circuit to any desired local station at any floor at which a waiting call is unanswered by the respective floor nurse within a predetermined time interval after said call has been initiated.

22. A calling and 2-way communication system according to claim 20 in which the head nurse's station is provided with a telephone set for answering any call which is waiting to be answered at its respective floor central station, means including said automatic seeking switch and a multi-point manually operable selector switch for establishing a 2-way communication circuit between the said telephone set and any desired local station at which an unanswered call is waiting, means effective when said telephone set is taken into use by removal from its support by the head nurse to cancel the said call initiating signal corresponding to said desired local station, relay means associated with the head nurse's station to prevent the cancellation of any other waiting calls when said manually operable selector switch is being moved to successive positions.

23. In a calling and 2-way communication system for hospitals and the like, the combination of a plurality of floor-nurse central stations each having an automatic seeking switch, a plurality of local stations on each floor, each local station having control means to operate said automatic switch for enabling the local station to set up at its floor central station a visual indication identifying that local station, a head nurse's station, a manually operable selector switch at said head nurse's station to select any one of the floor central stations and for causing said automatic seeking switch to establish a 2-way communication circuit between the head nurse's station and the selected floor central station.

24. A system according to claim 23 in which each floor central station is provided with means to set up a visual display identifying the head nurse's station when a call is placed thereto by the head nurse.

25. A calling and 2-way communication system for hospitals and the like, comprising a plurality of patients' bedside calling and communication control units arranged in groups, a plurality of nurse's central stations one for each of said groups and each having a control panel and a single automatic seeking switch, means at each unit for operating the seeking switch at the corresponding central panel for automatically extending a 2-way communication circuit between said unit and the corresponding nurse's control panel, an operating room or similar critical location having control equipment for enabling personnel thereat to operate any one of said automatic seeking switches to automatically set up a 2-way communication circuit between said location and the corresponding one of said nurse's central stations, and including means to prevent the said central stations from extending a call therefrom to said critical location.

26. A calling and 2-way communication system according to claim 25 in which said control equipment at the critical location includes a series of manually operable switches one for each central station, and circuit connections between said manually operable switches and respective ones of said central stations and responsive to the selective operation of one of said manually operable switches for causing the automatic seeking switch at the corresponding central stations to set up said 2-way communication circuit between the critical location and the said central station.

27. In a system of the kind described, a plurality of local stations each having a signal pickup device, a central station including a sound reproducer, an automatic seeking switch, a stepping magnet and stepping magnet control circuit for said switch, means effective when a local station initiates a call for causing said seeking switch to seek said calling station and to connect it with said central station, and means controlled from the central station independently of said local stations for successively stepping said seeking switch to connect the pickup device at each local station in succession to said reproducer to detect abnormal sound conditions picked up by each pickup device at its local station.

28. A system according to claim 27 in which the last-mentioned means includes a manually operable switch at the central station connected to said stepping circuit for intermittently opening and closing said stepping circuit to step said seeking switch one step per operation of said manually operable switch.

29. A system according to claim 28 in which another manually operable switch is provided at the central station and connected to said stepping circuit and which, when operated once, automatically and recurrently opens and closes said stepping circuit and thereby causes said seeking switch to continuously step at a controlled rate.

30. In a system of the kind described, a plurality of local stations each having a sound reproducing device, a central station, an automatic seeking switch, means effective when a local station initiates a call to cause said seeking switch to seek the calling station and to connect it with the central station, a tone signal generator at the central station, means controlled from the central station independently of the local stations for advancing said switch automatically step-by-step to transmit said tone to the sound reproducers at said local stations, and means for automatically terminating the stepping of said automatic switch when the said tone has been transmitted to all said local stations.

31. In a system of the kind described, a plurality of local stations each having a sound reproducing device, a central station, an automatic seeking switch, means effective when a local station initiates a call to cause said seeking switch to seek for the calling station to connect it with the central station, a tone signal generator at the central station, means controlled from the central station independently of the local stations for continuously advancing said switch automatically step-by-step to repeatedly and cyclically transmit said tone to the sound reproducers at said local stations.

32. In a system of the kind described, a plurality of local stations, a central station, single automatic seeking switch having series of sets of bank contacts for allotment to local stations in use, means responsive to the initiation of a call at a local station for causing said switch to seek said station and to connect it with said central station, means at said central station for automatically controlling the step-by-step operation of said seeking switch independently of said local stations and for causing said switch to be delayed a predetermined time on each set of bank contacts corresponding to a station in use, and additional means for causing said switch to automatically skip without delay over bank contact sets corresponding to stations not in use.

33. A system according to claim 32 in which a series of individual station-identifying lamps are provided at the central station each wired to a corresponding bank contact in said seeking switch corresponding to a local station which is wired for service, said lamps being removably mounted in a corresponding socket, and means to replace any desired lamp by a conductive member to cause said automatic switch to skip the bank contacts allotted to the corresponding local station when that station is not wired for service.

References Cited in the file of this patent

UNITED STATES PATENTS

| | | |
|---|---|---|
| 2,244,700 | Horton | June 10, 1941 |
| 2,335,524 | Lomax | Nov. 30, 1943 |
| 2,491,903 | Pearce | Dec. 20, 1949 |
| 2,496,629 | Lamberty | Feb. 7, 1950 |
| 2,598,098 | Balzer | May 27, 1952 |
| 2,708,691 | Molnar | May 17, 1955 |